(12) United States Patent
Roodenburg et al.

(10) Patent No.: US 11,293,158 B2
(45) Date of Patent: Apr. 5, 2022

(54) PILE HOLDING SYSTEM
(71) Applicant: ITREC B.V., Schiedam (NL)
(72) Inventors: Joop Roodenburg, Schiedam (NL); Terence Willem August Vehmeijer, Schiedam (NL); Stefan Cornelis Van Ruyven, Schiedam (NL); Maarten Hugo Hoofman, Schiedam (NL)
(73) Assignee: ITREC B.V., Schiedam (NL)
( * ) Notice: Subject to any disclaimer, the term of this patent is extended or adjusted under 35 U.S.C. 154(b) by 0 days.
(21) Appl. No.: 16/956,480
(22) PCT Filed: Dec. 21, 2018
(86) PCT No.: PCT/NL2018/050879
§ 371 (c)(1),
(2) Date: Jun. 19, 2020
(87) PCT Pub. No.: WO2019/125172
PCT Pub. Date: Jun. 27, 2019
(65) Prior Publication Data
US 2020/0347960 A1 Nov. 5, 2020
(30) Foreign Application Priority Data
Dec. 22, 2017 (WO) ............... PCT/NL2017/050877
Mar. 6, 2018 (NL) .................................... 2020536
(51) Int. Cl.
E02D 13/04 (2006.01)
F03D 13/25 (2016.01)
(Continued)
(52) U.S. Cl.
CPC .............. E02D 13/04 (2013.01); B63B 35/00 (2013.01); E02D 27/425 (2013.01);
(Continued)
(58) Field of Classification Search
CPC . E02D 13/04; F03D 13/25; E02B 2017/0039; E02B 2017/0047;
(Continued)

(56) References Cited

U.S. PATENT DOCUMENTS 4,045,969 A * 9/1977 Jansz ..................... B63B 35/44
 405/228
4,051,685 A * 10/1977 Jansz ....................... E02D 7/00
 405/228
(Continued)

FOREIGN PATENT DOCUMENTS

CN 102660950 A 9/2012
DE 20 2015 104 284 U1 11/2015
(Continued)

OTHER PUBLICATIONS

International Search Report (PCT/ISA/210) issued in PCT/NL2017/050877, dated May 11, 2018.
(Continued)

Primary Examiner — Frederick L Lagman
(74) Attorney, Agent, or Firm — Birch, Stewart, Kolasch & Birch, LLP

(57) ABSTRACT

A pile holding system configured to support the pile in an upright position at a pile installation location next to the vessel. The pile holding system includes a pile holder and a pile holder support system. The pile holder support system is configured to be mounted on the deck of the vessel, to moveably support the pile holder, and to move the pile holder in a first direction between an inboard position and an outboard position. The pile holder, when in the outboard position, is located outside the contour of the vessel, for holding the pile in the upright position at the installation location. The pile holder, when in the inboard position with the first and second jaw in the open position, is located within the contour of the vessel.

20 Claims, 8 Drawing Sheets

Figure 1:
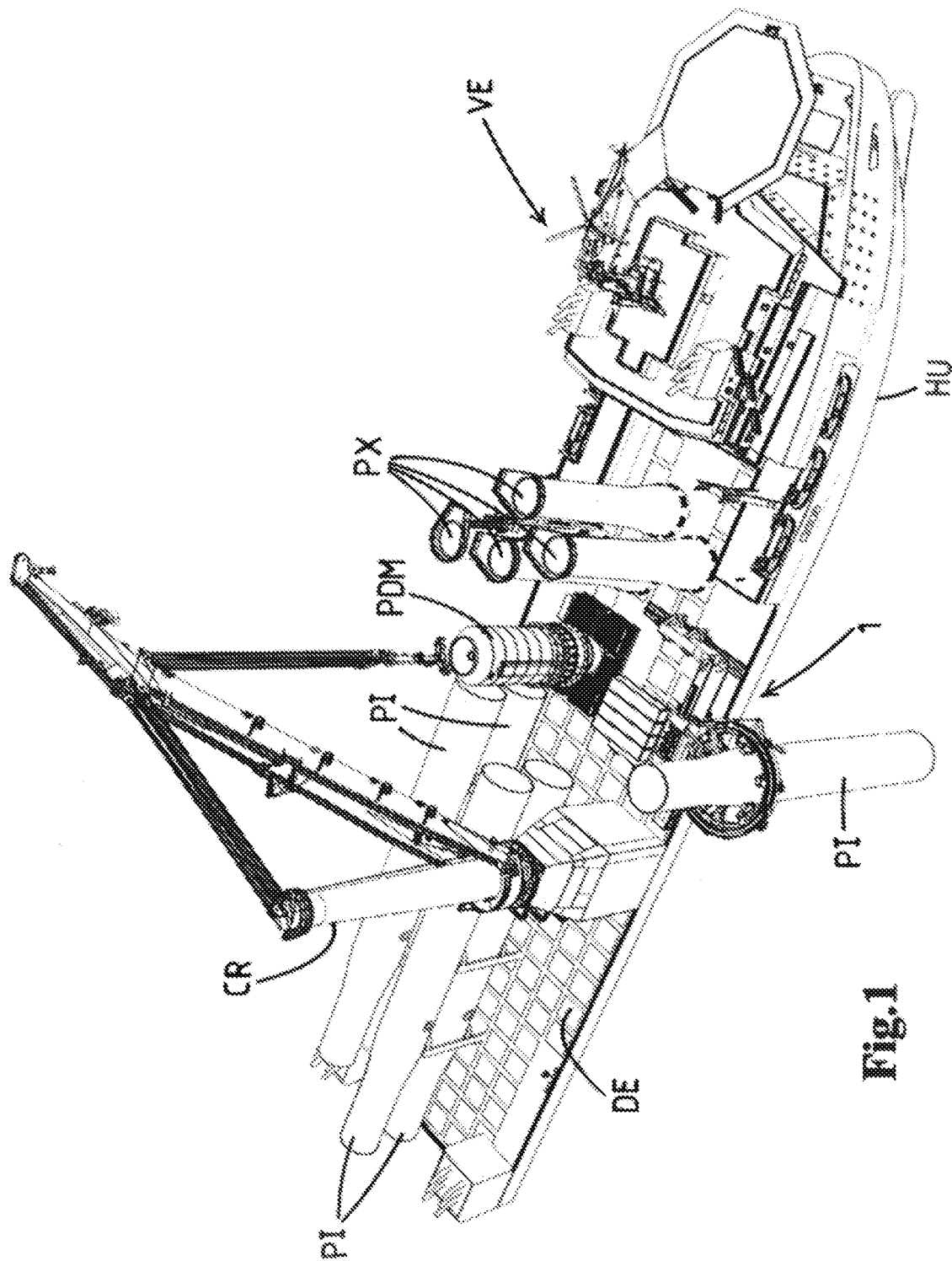

(51) Int. Cl.
    *E02D 27/42*     (2006.01)
    *E02D 27/52*     (2006.01)
    *F16L 1/20*     (2006.01)
    *B63B 35/00*     (2020.01)
    *E02B 17/00*     (2006.01)

(52) U.S. Cl.
    CPC ........... *E02D 27/525* (2013.01); *F03D 13/25* (2016.05); *F16L 1/207* (2013.01); *E02B 2017/0043* (2013.01); *E02B 2017/0065* (2013.01); *E02B 2017/0091* (2013.01)

(58) Field of Classification Search
    CPC ..... E02B 2017/0056; E02B 2017/0065; E02B 2017/0091
    USPC .................................................. 405/227, 228
    See application file for complete search history.

(56) References Cited

U.S. PATENT DOCUMENTS

| | | | | |
|---|---|---|---|---|
| 4,102,147 | A * | 7/1978 | Jansz | E02D 13/04 405/228 |
| 9,222,233 | B2 * | 12/2015 | Peters | E02D 7/16 |
| 11,008,726 | B2 * | 5/2021 | Vehmeijer | E02D 27/425 |
| 2018/0106007 | A1 * | 4/2018 | Mack | E02D 27/52 |
| 2018/0355574 | A1 * | 12/2018 | Huang | E02D 13/04 |
| 2018/0355575 | A1 * | 12/2018 | Huang | E02D 13/04 |
| 2019/0211524 | A1 * | 7/2019 | Angelov | E02D 7/14 |
| 2021/0047009 | A1 * | 2/2021 | Roodenburg | B63B 35/00 |

FOREIGN PATENT DOCUMENTS

| | | |
|---|---|---|
| EP | 2 641 825 A1 | 9/2013 |
| EP | 2 886 722 A1 | 6/2015 |
| EP | 3 144 213 A1 | 3/2017 |
| GB | 2492402 A | 1/2013 |
| JP | 60-126427 U | 8/1985 |
| JP | 62-021139 U | 2/1987 |
| JP | 2007-032017 A | 2/2007 |
| JP | 2011/140754 A | 7/2011 |
| WO | WO 2018/117846 A1 | 6/2018 |

OTHER PUBLICATIONS

International Search Report (PCT/ISA/210) issued in PCT/NL2018/050879, dated Sep. 13, 2019.

Written Opinion (PCT/ISA/237) issued in PCT/NL2018/050879, dated Sep. 13, 2019.

* cited by examiner

PILE HOLDING SYSTEM

The invention relates to a pile holding system to be mounted on a deck of a vessel, e.g. for installation of a pile adapted to support an offshore wind turbine, which pile holding system is configured to support the pile in an upright position at a pile installation location next to the vessel. The invention further relates to a vessel comprising such a pile holding system and a pile installation method in which use is made of such a vessel and/or pile holding system.

In a known method for installing an offshore wind turbine, the foundation, in the form of a pile, is installed by first driving the pile into the sea bottom after which the wind turbine is installed on the pile, either by installing the wind turbine at once as a whole or by assembling the wind turbine in parts on the pile. In this known method, the pile is installed by driving the pile into the sea bottom after which the upper part of the wind turbine may be installed on top of the pile. The pile is transported to the installation location on board a vessel. Once the vessel has arrived at the pile installation location the pile is set up at the pile installation location for driving. During driving the pile is typically supported by a pile holding system comprised on the vessel.

There is a trend towards larger wind turbines and a desire to install offshore wind turbines at locations with larger water depths than currently encountered. Both result in larger and heavier foundations. Hence, it is expected that in the near future piles need to be installed that are larger than 100 metres, possibly 120 metres or lager. The weight of such piles may be larger than 1000 mt, possibly 1300 mt or above.

To enable the pile holder to support the pile during driving, the pile holder is to be supported outside the contour of the vessel. Preferably, the pile holder is not permanently fixed in that outboard position, and can be moved into a storage position when not needed for supporting a pile. When stored, the pile holder no longer protrudes beyond the contour of the vessel, which facilitates moving the ship relative to other ships and obstacles.

CN102660950 discloses a pile holding system comprising a pile holder and a pile holder support system. The pile holder support system comprises a frame that is to be mounted on the deck of a vessel to support the pile holder in an outboard positon, i.e. outside the contour of the vessel. The pile holder support system is furthermore configured to move the pile holder relative to the pile holder support system, to allow for adjusting the outboard position of the pile holder relative to the vessel for supporting the pile in an upright position at the correct pile installation location. The pile holding system is not configured to move the pile holder from the outboard position into an inboard position, i.e. into a position in which the pile holder is located within the contour of the vessel.

Because the deck space on most vessels is a limited commodity, the footprint of a pile holding system is preferably kept minimal. Also, it is preferred that the pile holder, when stored, takes up minimal deck space. In some prior art, the pile holding system is removed by crane when not in use, and is stored on deck or on a support vessel. Removing and installing the pile holding system is an elaborate process. Therefore, pile holding systems have been developed that can be switched between an active position, in which the pile holder can be used for supporting a pile, and an inactive position in which the pile holder for example is folded along the hull of the vessel.

EP2886722 discloses a pile holding system comprising a support frame and a pile holder. The support frame is hingeably mounted to the deck of the vessel, such that the frame can be pivoted between a raised position and a lowered position. In the raised position, the frame positions the pile holder in a tilted position and close to the contour of the vessel. In the lowered position, the frame supports a pile holder in a horizontal holding positon, outside the contour of the vessel, for supporting that pile in an upright position. Pivoting the pile holder between an inboard position and an outboard position, requires an elaborate frame and thus provides the pile holding system with a large footprint. Furthermore, due to the elaborate frame, the pile holder is supported relatively far from the hull of the vessel during installation of the pile, which requires an extra rigid, and thus heavy, frame.

Installation of piles is currently done using jack-up vessels in which legs are lowered into the water to lift the vessel at least partially out of the water so that waves have a limited or minimal effect on the vessel. However, a drawback of such a jack-up type vessel is that it takes a lot of time to lower the legs and to lift the vessel out of the water and to go through the reverse process after installation of the pile.

It is an object of the invention to provide an alternative pile holding system. It is a further object of the invention to provide an improved pile holding system which allows for a more efficient use of deck space. It is a further object of the invention to provide an improved method for installation of a pile adapted to support an offshore wind turbine.

According to a first aspect of the invention, there is provided a pile holding system to be mounted on a deck of a vessel, e.g. for installation of a pile adapted to support an offshore wind turbine, which pile holding system is configured to support the pile in an upright position at a pile installation location next to the vessel, the pile holding system comprising:

a pile holder comprising a base structure, a first jaw and a second jaw, the first jaw and the second jaw each extending between an inner end and an outer end, and wherein the first and second jaws are pivotable connected at the inner end thereof to a respective pivot part of the base structure to pivot about a jaw pivot axis between a closed position, in which the pile holder defines a pile passage for the pile held in the pile holder, and an open position, to allow the pile to be received in, or to be removed from, the pile holder in a lateral direction;

a plurality of pile engaging devices, wherein the base structure, the first jaw and the second jaw each support at least one pile engaging device, the engaging devices each comprising one or more pile engaging elements, e.g. each comprising one or more pile guiding rollers for engaging the pile in the pile passage; and a pile holder support system to be mounted on the deck of the vessel, wherein the support system moveably supports the pile holder, preferably at the base structure, and which support system is configured to move the pile holder in a first direction, which first direction, when the pile holding system is mounted on the deck of a vessel, is substantially parallel to the deck of the vessel, between an inboard position and an outboard position, wherein the pile holder, when in the outboard position, is located outside a contour of the vessel, for holding the pile in the upright position at the installation location, and wherein the pile holder, when in the inboard position with the first and second jaw in the open position, is located within the contour of the vessel.

The pile holding system of the invention is to be mounted on a deck of a vessel, the vessel having a hull that supports the deck and that in a plan view defines a contour of the vessel.

When the pile holding system is mounted on the deck of a vessel, the first direction is substantially parallel to the deck of the vessel. Thus, when the pile holder is moved in the first direction it is moved in a substantially horizontal direction.

The pile holder support system is configured to support the pile holder in an outboard position, in which outboard position the pile holder can engage, with the pile engaging devices, a pile adapted to support an offshore wind turbine, and support that pile in an upright position at a pile installation location next to the vessel.

The pile holder support system is furthermore configured to move the pile holder in the first direction from that outboard position, in which the pile holder is located outside the contour of the vessel, into the inboard position, in which the pile holder is located inside the contour of the vessel. Thus, the pile holder can be moved parallel to the first direction between a position in which the pile holder, when seen in a plan view, is located next to the deck of the vessel, into a position in which the pile holder is located above the deck of the vessel.

With a pile holding system according to the claimed invention, the pile holder can be moved into the inboard positon by the pile holder support system. Moving the pile holder into the inboard position does not require the pile holder to be removed from the pile holder support system, and does not require demounting the pile holder support system from the deck of the vessel. Thus, the pile holder can be moved quickly and efficiently between the inboard position and the outboard position.

Furthermore, with the pile holding system according to the invention, opening the jaws reduces the size of the pile holder in the first direction, and thus the distance over which the pile holder is to be moved to bring it within the contour of the vessel is reduced.

According to the claimed invention, the pile holding system is configured, more in particular the pile holder support system and the pile holder are configured, to position the pile holder in the inboard position with the first and second jaw in the open position. Due to this open-jaw inboard position, the distance over which the pile holder is to be moved to bring it within the contour of the vessel is reduced, which speeds up the process.

Furthermore, due to the open-jaw inboard position of the pile holder, the footprint of the pile holder, when in the inboard position, has an elongated shape. Also, the footprint of the pile holder in the inboard position is located adjacent the contour of the vessel, and extends along the contour of the vessel, which furthermore allows for a pile holder support system located adjacent the contour of the vessel. In the prior art, the foot print of the pile holder support system comprises a large area, which area extends in a direction away from the contour of the vessel, and thus occupies more, and more useable, deck space. In this context it is noted that the deck space closely adjacent the contour of the vessel, is less suitable for storage of objects, and is less intensively used, compared to the deck space located further way from the contour of the vessel.

With the pile holding system according to the invention, opening the jaws reduces the size of the pile holder in the first direction, and thus the distance over which the pile holder is to be moved to bring it within the contour of the vessel is reduced.

In an embodiment, the jaw pivot axis of the first jaw and the jaw pivot axis of the second jaw define a plane, wherein the outer ends of the first and second jaw are located at a side of the plane when the first jaw and the second jaw are in the closed position, and wherein the outer ends of the first and second jaws are located in the plane or at an opposite side of the plane when the first jaw and the second jaw are in the open position.

Such a configuration allows for the jaws to open wide, i.e. up to, or even beyond, the pivot part of the base structure, and more in particular allows for the jaws to be opened to such an extent that the base structure of the pile holder becomes the part of the pile holder that extends farthest in the first direction. Thus, with a pile holding system according to the claimed invention, moving the base part within the contour of the vessel, brings the entire pile holder, i.e. with the first jaw and second jaw in the open position, within the contour of the vessel.

In a further embodiment, the first jaw and the second jaw, when in the open-jaw configuration, extend in opposite directions and substantially perpendicular to the first direction. In such an embodiment, the size of the pile holder in the first direction is minimal.

When the pile holder is in the inboard position, substantially the entire pile holding system is located within the contour of the vessel. An advantage of being able to fully retract the pile holder within the contour of the vessel is that large objects, e.g. a pilling hammer or transition piece, mounted on, or being part of, the pile, can easily pass the pile holding system.

In an embodiment, the pile holding system further comprises an actuation system configured to pivot the first jaw between its closed position and its open position and configured to pivot the second jaw between its closed position and its open position.

In an embodiment, the pile holder in the outboard position and in the inboard position has a horizontal orientation, and wherein the support system is configured to move the pile holder between the inboard position and the outboard position while maintaining the horizontal orientation of the pile holder.

In such an embodiment, the pile holder is supported in the inboard position in the same position it is used in, i.e. with a horizontal configuration in which a central axis defined by the pile holder, which central axis substantially coincides with the central axis of a pile supported by the pile holder, extends in the vertical direction. This facilitates a quick and efficient switch between the storage position and the holding positon, because there is no need for the pile holder to be for example pivoted into a tilted or upstanding position during the process.

In other words, because the pile holder, when in the inboard position, is supported in a horizontal position and with the jaws in the open position, the pile holder is supported in a positon ready for engaging a pile. The pile holder only needs to be moved in the first direction out of the inboard position, to engage a pile located adjacent the vessel at a pile installation location. This allows for a quick deployment of the pile holder.

Also, because the pile holder is not tilted or pivoted when moved between the inboard position and the outboard position, it is supported in the inboard position having substantially the same orientation as when it is in the outboard position, i.e. has a horizontal orientation in both the inboard and the outboard position. Thus, an additional advantage of the current invention is that, while in the inboard position, the pile holder can be easily accessed for maintenance and inspection. This because the pile holder and its components can be accessed and checked in the same way and in the same position that these components are accessed and supported during use of the pile holder in the outboard position. For example a walkway provided on the pile holder to provide access to components of the pile holder during use, e.g. a hydraulic power source, can also be used when the pile holder is supported in the inboard position. This allows for a simple design of the pile holder.

In an alternative embodiment, the base structure of the pile holder is pivotally mounted to the support system, to enable the pile holder to be pivoted relative to the support system about a base structure pivot axis between a substantially vertical orientation, when in the inboard position, and a substantially horizontal orientation, when in the outboard position. In this example it is envisaged that the pile holder is tilted in the substantially vertical orientation when in the inboard position, in view of sailing with the vessel, mooring in a port, etc., while the pile holder is tilted in the substantially horizontal orientation for supporting a pile, as it is envisaged that a pile is hoisted by a crane and placed in vertical orientation before engagement thereof by the pile holder.

In an embodiment, the pile holder support system comprises: a track, preferably a track to be mounted on the deck of the vessel, the track extending in the first direction, and a base carriage configured to support the base structure of the pile holder, which base carriage is furthermore configured for movement along the track between a positon for supporting the pile holder in the outboard position and a position for supporting the pile holder in the inboard position.

In a further embodiment, the pile holder has a length in the first direction, and wherein the track has a length in the first direction, and wherein the length of the track, more in particular the travel distance of the base cart along the track when moving the pile holder between the inboard and the outboard position, is less than the length of the pile holder with the first jaw and the second jaw in the closed position, and the length of the track, more in particular the travel distance of the base cart along the track when moving the pile holder between the inboard and the outboard position, is substantially similar to, preferably is more than, the length of the pile holder with the first jaw and the second jaw in the open position.

Thus, the track length is kept short, and therefore the footprint of the pile holding system can be kept to a minimum.

In an embodiment, the pile holder has a length in the first direction, and wherein the track has a length in the first direction, and the length of the track, more in particular the travel distance of the base cart along the track when moving the pile holder between the inboard and the outboard position, is substantially similar to the length of the pile holder with the first jaw and the second jaw in the open position.

Thus, the track length is kept to a minimum, and therefore the footprint of the pile holding system can be kept to a minimum.

In an embodiment, the pile holder has a width in a direction perpendicular to the first direction, and the track has a width in a direction perpendicular to the first direction, and the width of the track is less than the width of the pile holder with the first jaw and the second jaw in the open position, preferably the width of the track is less than 60% of the width of the pile holder with the first jaw and the second jaw in the open position, Thus, the track width is kept to a minimum, and therefore the footprint of the pile holding system can be kept to a minimum. In a further embodiment, the track comprises a single rail, and the pile holder extends on opposite sides of that rail. Thus, the direct footprint, i.e. the deck area covered by the rail, is kept to a minimum.

In a further embodiment, the first jaw and the second jaw, when in the open-jaw configuration, extend in opposite directions and substantially perpendicular to the first direction, such that in a top view the pile holding system with the pile holder in the outboard position and the first jaw and the second jaw in the open position is T-shaped.

In an embodiment, the pile holder support system is configured for moving the pile holder in a second direction, which preferably is perpendicular to the first direction, between a first outer position and a second outer position, to allow the support system to position the pile holder in a horizontal plane relative to the vessel. Thus, when the pile holding system is mounted on the deck of the vessel, the pile holder is moved substantially parallel to the deck of the vessel when moved in the second direction.

The combination of movement in the first direction and the second direction, allows for positioning the pile holder in the horizontal plane relative to the vessel, more in particular allows for positioning the pile holder relative to the vessel when in the outboard position. thus the pile holder can be correctly aligned with a pile at the installation location next to the vessel, to support the pile in the upright position. It is noted that the vessel with the pile holding system may not be entirely correctly positioned relative to the installation location. In such a case the pile holder support system may be used to correctly align the pile holder with the installation location. Also, during the driving of the pile into the sea bottom the pile may tilt, which deviation may be compensated for by adjusting the position of the pile holder, thu pushing the pile back into the upright position.

In an embodiment, the pile holder support system comprises a track, preferably a track to be mounted on the deck of the vessel, the track extending in the first direction, and a base carriage for movement along the track. In this embodiment, the base carriage is configured to support the base structure, and the base structure is moveable, preferably in a second direction perpendicular to the first direction, between a first outer position and a second outer position, to allow the pile holder support system to position the pile holder in a horizontal plane relative to the vessel.

In an alternative embodiment, the track may extend in the second direction and the base structure is moveable relative to the base carriage in the first direction.

In an embodiment, the track comprises one or more rails that extend in the first direction, and the pile holder support system comprises a base carriage configured to support the base structure of the pile holder, which base carriage is furthermore configured for movement along the track, i.e. along the one or more rails, between a positon for supporting the pile holder in the outboard position and a position for supporting the pile holder in the inboard position.

In an embodiment, the track comprises a single rail and a single carriage for movement along the track. In an alternative embodiment, the track comprises two rails, which rails are set up spaced from and parallel to each other. In such an embodiment, the base carriage preferably comprises a U-shaped carriage frame, the carriage frame comprising two legs, each leg extending along a rail of the track, and at least one cross section connecting the legs. Preferably, the at least one cross section connects the legs at an end of the legs facing the pile holder. The at least one cross section preferably supports the base structure.

In an embodiment, the base carriage comprises a U-shaped carriage frame, the carriage frame comprising two legs, each leg extending along a track, preferably each leg extending along a rail of the track, and at least one cross section connecting the legs, wherein the at least one cross section preferably connects the legs at an end of the legs facing the pile holder, and wherein the at least one cross section preferably supports the base structure.

In an embodiment, the base carriage comprises a I-shaped or T-shaped carriage frame, the carriage frame comprising a part corresponding to the vertical bar of the I-shape or T-shape, wherein said part extends along a track, and wherein another track is provided at a free end of the I-shaped carriage frame or the part of the carriage frame corresponding to the horizontal bar of the T-shape, and wherein the base structure is moveable connected to said other track.

In an embodiment, the pile support system further comprises a control system, which control system is configured to provide active motion compensation in the horizontal plane while the pile holder supports the pile in the upright position at the installation location next to the vessel to compensate for movement of the vessel relative to the pile installation location.

In an embodiment, the pile holder support system further comprises a monitoring system that is configured to monitor the position and/or orientation of the pile while the pile is being loaded into the pile holder and/or while the pile holder supports the pile in the upright position at the pile installation location next to the vessel, and a control system that is configured to control movement of the first and second jaws and the support system.

In an embodiment, the control system is configured to move the pile away from the vessel by moving the pile holder towards and/or past the outboard position when the monitoring system indicates that the position and/or orientation of the pile exceeds a predetermined first value.

In an embodiment, the control system is configured to automatically move the first and second jaws to their respective open positions to avoid interference between the pile on the one hand and the first and second jaws on the other hand.

In other words, the control system may be configured to push the pile away from the vessel by moving the pile holder towards and/or past the outboard position when the jaws of the pile holder are in the open position, and/or to automatically open the jaws of the pile holder and moving the pile holder towards and/or past the outboard position, when the position and/or orientation of the pile exceeds a predetermined value.

In such embodiments, the support system is preferably configured to move the pile holder beyond the outboard position, in particular when the pile is not yet driven into the sea floor. Preferably, the control system is configured to encompass information regarding the installation of the pile, more in particular is able to monitor, e.g. using the monitoring system, if the pile is already driven into the sea floor and preferably only allows for pushing the pile away from the vessel when the pile is not yet mounted in the sea floor, and/or is no longer supported by a crane, and/or is configured to remove a connection between the pile and a crane supporting the pile.

In an embodiment, the control system is configured to move the pile holder away from the pile by moving the pile holder towards the inboard position when the monitoring system indicates that the position and/or orientation of the pile exceeds a predetermined second value. The first and second value may be the same. This embodiment may particularly be useful when the pile is already at least partially driven into the sea floor and pushing the pile away is no longer possible, feasible or desired.

The monitoring system may further be configured to monitor if the pile is already at least partially driven into the sea floor, so that the control system activates the above embodiment. i.e. function, when the pile is at least partially driven into the sea floor. Manual activation of this function is of course also possible.

In an embodiment, the first jaw and the second jaw are pivoted over an angle of about 90 degrees, when pivoted from the closed position into the open position, and preferably the first jaw and the second jaw, when in the open-jaw configuration, extend in opposite directions and substantially perpendicular to the first direction.

In an embodiment, the base section and the first jaw and the second jaw each extend along a 120 degree arc-shaped trajectory. The base section and the first and second jaws thus each may form one third of the circumference of the pile holder when the first and second jaws are in the closed position.

In an embodiment, the first jaw and the second jaw and preferably the base structure each have a semi-circular configuration to provide the pile holder with an annular configuration having a circular inner circumference when the jaws are in the closed position.

In an embodiment, when the first jaw and the second jaw are in the closed position, the outer ends of the jaws join up, and wherein preferably a locking mechanism is provided to lock the first jaw and the second jaw in their closed positions, e.g. by connecting the outer ends to each other.

In an embodiment, the pile holder comprises a fender structure, preferably mounted on the base structure, for rough positioning of the pile and/or collision prevention between pile and other pile holder portions.

In an embodiment, each pile engaging device comprises a suspension arm, each suspension arm having an engaging end and a pivot end, wherein the suspension arm is at the pivot end pivotable supported, such that the suspension arm is pivotable about a pivot axis, preferably the pivot end being a top end of the suspension arm and the pivot axis preferably being a horizontal pivot axis, and wherein each suspension arm is at the engaging end provided with one or more pile engaging elements.

In an embodiment, each pile engaging device comprises a suspension arm actuator to position the suspension arm at different angular positions about the pivot axis to allow simultaneous engagement of all pile engaging devices with corresponding piles having different diameters when the first and second jaws are in their closed positions.

The above embodiments allow to adjust for changes in diameter of the pile being lowered through the pile passage while the pile engaging devices engages the outer surface of the pile. The suspension arm actuators may be controlled using a diameter adjustment system configured to keep pile centre fixed and allow pile engaging elements, e.g. rollers to translate substantially perpendicular to pile surface. An advantage thereof is that no slipping occurs over coating for conical sections of a pile.

In an embodiment, the pile engaging devices comprise a chassis, wherein the first jaw and the second jaw, and preferably the base structure, each comprise a track structure. e.g. a rack or rail section, extending along a longitudinal direction of the respective first jaw, second jaw or base structure, wherein the chassis of each of the pile engaging devices is moveably supported on one of the track structures, and wherein each chassis is provided with a drive adapted to move the chassis along the track structure.

In an embodiment, the suspension arm actuator is provided between the chassis and the suspension arm.

In an embodiment, the pile holder with the first jaw and the second jaw in the closed position forms an annular structure and the track structures extend along the inner circumference of the annular structure, preferably the complete inner circumference.

In an embodiment, the pile holding system further comprises a control system configured to control the drives of the pile engaging devices, and to drive the pile engaging device in unison along the track structures.

In an embodiment, the one or more pile engaging elements comprise pile guiding rollers, preferably comprise two or more pile guiding rollers supported in a carrier that is pivotably connected to a support end of a suspension arm to pivot about a carrier pivot axis, which suspension arm in turn is pivotable about a suspension arm pivot axis, wherein the pile guiding rollers each have an axis of rotation, wherein the pile guiding rollers are supported by the carrier such that their axis of rotation extend parallel to the carrier pivot axis, and wherein preferably the carrier pivot axis extends parallel to the suspension arm pivot axis.

An advantage of the pile guiding rollers is that the pile engaging device is enabled to follow the changes in the diameter of the pile being lowered through the pile passage while the pile engaging device engages the outer surface of the pile In an embodiment, the track structures are semi-circular track structures.

The invention also relates to a vessel comprising a pile holding system mounted on a deck of the vessel, e.g. for installation of a pile adapted to support an offshore wind turbine, which pile holding system is configured to support the pile in an upright position at a pile installation location next to the vessel, the pile holding system comprising:
  a pile holder comprising a base structure, a first jaw and a second jaw, the first jaw and the second jaw each extending between an inner end and an outer end, and wherein the first and second jaw are pivotable connected at the inner end thereof to a respective pivot part of the base structure to pivot about a jaw pivot axis between a closed position, in which the pile holder defines a pile passage for the pile held in the pile holder, and an open position, to allow the pile to be received in, or to be removed from, the pile holder in a lateral direction;
  a plurality of pile engaging devices, wherein the base structure, the first jaw and the second jaw each support at least one pile engaging device, the engaging devices each comprising one or more pile engaging elements, e.g. each comprising one or more pile guiding rollers; and
  a support system mounted on the deck of the vessel, wherein the support system moveably supports the pile holder at the base structure, and which support system is configured to move the pile holder in a first direction between an inboard position and an outboard position, wherein the pile holder, when in the outboard position, is located outside the contour of the vessel, for holding the pile in the upright position at the installation location, and wherein the pile holder, when in the inboard position with the first and second jaw in the open position, is located within the contour of the vessel.

In an embodiment, the vessel has a longitudinal axis, the axis extending between a bow and an aft of the vessel, and wherein the pile holder when moved in the first direction is moved perpendicular to the longitudinal axis of the vessel.

In an embodiment, the pile holding system is arranged at a stem of the vessel to hold a pile outside the contour of the vessel seen from above at a stem side of the vessel.

In an embodiment, the vessel further comprises a crane to handle a pile, wherein the crane is arranged at a stem of the vessel in line with a centre of gravity of the vessel.

In an embodiment, the pile holding system is arranged next to the crane.

In an embodiment, the vessel further comprises a storage location at a stem of the vessel at a side of the crane opposite to the side where the pile holding system is arranged, which storage location allows to store a pile driving mechanism to drive a pile into a sea floor.

In an embodiment, the vessel comprises deck space to store piles in a horizontal orientation parallel to the longitudinal axis of the vessel.

The invention further relates to a method for installation of a pile adapted to support an offshore wind turbine, wherein at least partially use is made of a vessel according to the invention, and wherein the method comprises the following steps:
  a. transporting a pile to the offshore pile installation location;
  b. moving the pile holder from the inboard position to the outboard position and positioning the first and second jaws of the pile holder in the open position;
  c. lifting the pile at an upper end thereof, and positioning the pile in the pile holder;
  d. moving the first jaw and the second jaw of the pile holder to their closed positions;
  e. lowering the pile to the sea floor; and
  f. driving the pile into the sea floor.

In an embodiment, the method further comprises the step of positioning the pile relative to the installation location using the support system of the pile holding system.

In an embodiment, during step e. the pile is held by the pile holder.

In an embodiment, during at least one or more steps, preferably all steps, the vessel is in floating condition.

In an embodiment, during step e. and/or step f., the pile holder is compensated for wave-induced motion of the vessel to maintain a predetermined X-Y location independent of the wave-induced motion of the vessel.

In an embodiment, the vessel also carries out step a.

In an embodiment, step c. and/or step e. is carried out by a crane on the vessel.

In an embodiment, positioning the pile in the pile holder is carried out such that the pile and the pile holder are moved relative to each other until the pile engages with the fender structure of the pile holder.

In an embodiment, the pile engages with the fender structure after positioning the pile in the pile holder, and wherein the pile engaging devices are operated to engage with the pile only after step d.

It is furthermore noted that installing an offshore foundation pile also often involves rotating the pile about its longitudinal axis to correctly position it on the pile installation site, prior to driving the pile into the sea bottom. The features of the pile, such as entry doors, mounting apertures, power cable access openings, etc, have to be correctly oriented.

In the prior art, the pile is correctly orientated while it is supported by a crane in the pile holder, already engaged by pile engaging devices comprising rollers engaging the pile to centralise it in the pile holder. Typically, the prior art pile holder is provided with a pile drive, the pile drive comprising a movably supported drive wheel with a vertical rotational axis. To orientate the pile, the drive wheel is set to the circumferential surface of the pile, and is driven to thus rotate the pile about its vertical axis. Because the pile is also engaged by the pile engaging devices, typically in the form of rollers having a horizontal axis of rotation, the drive wheel has to be powerful, and be pressed hard onto the surface, to overcome the friction between the pile engaging devices and the pile, and to thus rotate the pile. This makes the process of rotating the pile difficult to manage and imprecise.

Furthermore, the prior art configuration has problems with features provided on the outer surface of the pile, for example mooring lugs or entry ports, potentially colliding with the pile engaging devices and/or the pile drive during rotation. Thus preventing correct orientation and/or requiring lifting or lowering of the pile during the orientation process.

It is a further object of the invention to provide an alternative pile holding system. It is a further object of the invention to provide an improved pile holder which allows for improved pile orientation. It is a further object of the invention to provide an improved method for installation of a pile adapted to support an offshore wind turbine.

According to a second aspect, the invention provides a pile holder for use in a pile holding system to be mounted on a deck of a vessel, e.g. for installation of a pile adapted to support an offshore wind turbine, which pile holding system is configured to support the pile in an upright position at a pile installation location next to the vessel, wherein the pile holder comprises:

a base structure, a first jaw and a second jaw, the first jaw and the second jaw each extending between an inner end and an outer end, and wherein the first and the second jaws are pivotable connected at the inner end thereof to a respective pivot part of the base structure to pivot about a jaw pivot axis between a closed position, in which the pile holder defines a pile passage for the pile held in the pile holder, and an open position, to allow the pile to be received in, or to be removed from, the pile holder in a lateral direction;

track structures, e.g. a rack or rail section, comprised in the first jaw and the second jaw, and preferably the base structure, the track structures extending along a longitudinal direction of the respective first jaw, second jaw or base structure, three primary pile engaging devices, wherein the primary pile engaging devices each comprise a chassis, one or more pile engaging elements, e.g. each comprise one or more pile guiding rollers for engaging the pile in the pile passage, and an actuator to move the one or more pile engaging elements between an active position and a passive position for respectively engaging and releasing the pile located in the pile holder, and to allow simultaneous engagement of all primary pile engaging devices with piles having different diameters, when the pile engaging elements are in the active position and the first and second jaws are in their closed positions, wherein the primary pile engaging devices further comprise a chassis, which chassis of each of the primary pile engaging devices is moveably supported on one of the track structures, wherein each chassis is provided with a drive adapted to move the chassis along the track structure, and therefore move the pile engaging devices, more in particular the pile engaging elements, along an inner circumference of the pile holder while engaging a pile, to rotate a pile supported by a crane in the pile holder about its longitudinal axis, and wherein the pile holding system further comprises a control system configured to control the drives of the pile engaging devices, and to drive the pile engaging devices in unison along the track structures.

It is submitted that the pile holder may also comprise four or more primary pile engaging devices, in which embodiment the control system is configured to drive all primary pile engaging device in unison along the track structures, A pile holder according to the claimed invention comprise three primary pile engaging devices, the primary pile engaging devices comprising a chassis that is moveably supported on one of the track structures provided on the pile holder. Each chassis is provided with a drive adapted to move the chassis along the track structure, and therefore move the pile engaging devices, more in particular the pile engaging elements, along an inner circumference of the pile holder while engaging a pile, to rotate a pile supported by a crane in the pile holder about its longitudinal axis.

Thus, with a pile holder according to the second aspect of the invention, there is no need for a pile drive. Furthermore, because the pile is rotated by the primary pile engaging devices, which engage the pile to also centralise it in the pile holder, the pile engaging devices, the pile engaging elements contacting the outer surface of the pile move with the pile. This allows for a more controlled process compared to the prior art, and thus for an efficient and precise orientation of the pile.

In an embodiment, the first jaw and the second jaw, and preferably the base structure, each comprise a track structure, e.g. a rack or rail section, extending along a longitudinal direction of the respective first jaw, second jaw or base structure. Preferably, the pile holder with the first jaw and the second jaw in the closed position forms an annular structure.

In an embodiment, the track structures are semi-circular track structures. The track structures are preferably aligned, i.e. extend along sections of a circle, the circle extending in a horizontal plane. In such an embodiment, the track structures may combine into a circular support track structure when the jaws of the pile holder are in the closed position.

In an embodiment, the pile holder with the first jaw and the second jaw in the closed position forms an annular structure and the track structures extend along the inner circumference of the annular structure, preferably the complete inner circumference. This, allows for pile engaging devices configured to travel along the entire inner circumference of the pile holder, and thus allows for rotating the pile over 360 degrees or more without the pile engaging devices having to release the pile.

In an embodiment, the one or more pile engaging elements of the primary pile engaging devices, comprise pile guiding rollers, preferably comprise two or more pile guiding rollers supported in a carrier that is pivotably connected to a support end of a suspension arm to pivot about a carrier pivot axis, which suspension arm in turn is pivotable about a suspension arm pivot axis, wherein the pile guiding rollers each have an axis of rotation, wherein the pile guiding rollers are supported by the carrier such that their axis of rotation extend parallel to the carrier pivot axis, and wherein preferably the carrier pivot axis extends parallel to the suspension arm pivot axis.

An advantage of the pile guiding rollers is that the primary pile engaging devices are enabled to follow the changes in the diameter of the pile being lowered through the pile passage while the pile engaging device engages the outer surface of the pile.

In an embodiment, the pile holder further comprises three secondary pile engaging devices for engaging a pile when the primary pile engaging devices are in the passive position, wherein the secondary pile engaging devices each comprise one or more pile engaging elements, e.g. each comprise one or more pile guiding rollers for engaging the pile in the pile passage, and an actuator to move the one or more pile engaging elements between an active position and a passive position for respectively engaging and releasing the pile located in the pile holder, and to allow simultaneous engagement of all secondary pile engaging devices with piles having different diameters, when the pile engaging elements are in the active position and the first and second jaws are in their closed positions.

In such an embodiment, the control system of the pile holding system is configured to control the drives of the primary pile engaging devices, and to drive the primary pile engaging device in unison along the track structures, and to control the drives of the secondary pile engaging devices, and to drive the secondary pile engaging devices in unison along the track structures, Providing three secondary pile engaging devices allows for the secondary engaging devices to engage the pile, and maintain its orientation, while the primary pile engaging devices release the pile. Thus, the primary pile engaging devices, after having been moved in one direction along the track structures to rotate the pile, can be moved in the opposite direction along the track structures, reengage the pile, and rotate the pile further. With such an embodiment, the track structures do not need to form a continuous track around the inner circumference of the pile holder to rotate the pile over 360 degrees. By repeatedly rotating the pile over a limited interval, the pile can still be rotated over 360 degrees or more.

In an embodiment, the secondary pile engaging devices further comprise a chassis, which chassis of each of the secondary pile engaging devices is moveably supported on one of the track structures, and wherein each chassis is provided with a drive adapted to move the chassis along the track structure, and therefore move the pile engaging devices, more in particular the pile engaging elements, along an inner circumference of the pile holder while engaging a pile, to rotate a pile supported by a crane in the pile holder about its longitudinal axis.

Thus, the pile can be rotated by both the primary pile engaging devices and the secondary pile engaging devices. Preferably, the secondary pile engaging devices are interposed between the primary pile engaging devices, such that along the circumference of the pile holder, the primary engaging devices alternate with the secondary engaging devices. This is for example beneficial when a surface feature of the pile is aligned with one of the primary pile engaging devices, preventing that pile engaging device from engaging the pile. In such a situation, the secondary pile engaging devices can be used, instead of the primary pile engaging devices, to engage and rotate the pile over a first angle. Once the pile has been rotated by the secondary pile engaging devices, the surface feature may have been moved sufficiently for the primary pile engaging devices to engage the pile and rotate the pile over a second angle.

In an embodiment each track structure supports at least one primary pile engaging device and at least one secondary pile engaging device. In an alternative embodiment, each track structure supports a primary pile engaging device or a secondary pile engaging device.

In an embodiment, one or more track structures are connected to each other, which allows for the pile engaging devices to be moved from one track structure to another, connected, track structure. This for example may also allow for one or more pile engaging devices to be moved to a single track structure temporarily, for example when the pile holder is supported in an inboard storage position.

In an embodiment, the track structures from a ring shaped track, extending along the full inner circumference of the pile holder, the ring shape track supporting the primary pile engaging devices and preferably supporting the secondary pile engaging devices In an embodiment, the track structures from a first ring shaped track and a second ring shaped track, both the first track and the second extending along the full inner circumference of the pile holder.

In an embodiment, the primary pile engaging devices, and preferably the secondary pile engaging devices, each comprises a suspension arm, each suspension arm having an engaging end and a pivot end, wherein the suspension arm is at the pivot end pivotable supported, such that the suspension arm is pivotable about a pivot axis, preferably the pivot end being a top end of the suspension arm and the pivot axis preferably being a horizontal pivot axis, and wherein each suspension arm is at the engaging end provided with one or more pile engaging elements.

In an embodiment, each pile engaging device comprises a suspension arm actuator to position the suspension arm at different angular positions about the pivot axis to allow simultaneous engagement of all pile engaging devices with corresponding piles having different diameters when the first and second jaws are in their closed positions.

In a further embodiment, the suspension arm actuator is provided between the chassis and the suspension arm.

The above embodiments allow to adjust for changes in diameter of the pile being lowered through the pile passage while the pile engaging devices engages the outer surface of the pile. The suspension arm actuators may be controlled using a diameter adjustment system configured to keep pile centre fixed and allow pile engaging elements, e.g. rollers to translate substantially perpendicular to pile surface. An advantage thereof is that no slipping occurs over coating for conical sections of a pile.

In an embodiment, the pile holder with the first jaw and the second jaw in the closed position forms an annular structure and the track structures extend along the inner circumference of the annular structure, preferably the complete inner circumference.

In an embodiment, the one or more pile engaging elements comprise pile guiding rollers, preferably comprise two or more pile guiding rollers supported in a carrier that is pivotably connected to a support end of a suspension arm to pivot about a carrier pivot axis, which suspension arm in turn is pivotable about a suspension arm pivot axis, wherein the pile guiding rollers each have an axis of rotation, wherein the pile guiding rollers are supported by the carrier such that their axis of rotation extend parallel to the carrier pivot axis, and wherein preferably the carrier pivot axis extends parallel to the suspension arm pivot axis.

An advantage of the pile guiding rollers is that the pile engaging device is enabled to follow the changes in the diameter of the pile being lowered through the pile passage while the pile engaging device engages the outer surface of the pile In an embodiment, the base structure, the first jaw and the second jaw each support at least one pile engaging device.

According to the second aspect, the invention furthermore provides a pile holding system to be mounted on a deck of a vessel, e.g. for installation of a pile adapted to support an offshore wind turbine, which pile holding system is configured to support the pile in an upright position at a pile installation location next to the vessel, the pile holding system comprising:
- a pile holder according to the second aspect of the invention, and
- a pile holder support system to be mounted on the deck of the vessel, wherein the support system supports the pile holder at the base structure, preferably moveably the pile holder at the base structure.

In an embodiment, the pile holder support system is configured to move the pile holder, preferably in a first direction, which first direction, when the pile holding system is mounted on the deck of a vessel is substantially parallel to the deck of the vessel, between an inboard position and an outboard position.

In an embodiment, the pile holder, when in the outboard position, is located outside a contour of the vessel, for holding the pile in the upright position at the installation location, and wherein the pile holder, when in the inboard position with the first and second jaw in the open position, is located within the contour of the vessel.

According to the second aspect, the invention furthermore provides a method for rotating a pile to be driven in the sea bottom at a pile installation location, the method comprising the steps;
- positioning a vessel provided with a pile holder according to the second aspect of the invention next to the pile installation location, and supporting the pile holder in an outboard position for engaging the pile;
- using a crane to support the pile in a vertical position in the pile holder;
- engage the pile with the primary pile engaging devices supported on the track structures provided on the pile holder; and
- moving the primary pile engaging devices in a forward direction along the track structures, and thus rotating the pile about its longitudinal axis.

The present invention also relates to a pile holder accord to the second aspect, the pile holder comprising:
- a base structure. e.g. adapted to be mounted to a support frame as described herein, e.g. to be pivotally mounted to the support frame to pivot relative to the support frame about base pivot axis between a substantially vertical orientation and a substantially horizontal orientation,
- an annular structure configured to extent about a passage for a pile to be handled by the pile holder, the annular structure being supported by the base frame or the base frame structure forming a section of the annular structure,
- wherein the annular structure comprises two semi-circular jaws, each pivotally connected at an inner end thereof and pivotal about a pivot axis between a closed position, wherein outer ends of the jaws join up, and an opened position,
- wherein the annular structure is provided with a circular support track structure that carries multiple pile engaging devices, e.g. with pile guiding rollers, e.g. four or more, here six, of such devices,
- wherein, preferably, one or more, e.g. all, of the pile engaging devices are movable along the circular support track structure, at least over an arc segment of the circle, so as to allow for adaptation of the angular position of the pile engaging devices relative to the passage for the pile.

Thus, the pile holder may comprise an annular structure defined by two semi-circular jaws, which jaws are provided with pile engaging devices, e.g. the primary pile engaging devices.

In an embodiment each pile engaging device carries one or more, e.g. a pair of two, pile guiding rollers in a movable manner to allow for adjustment of the radial position of the rollers relative to the passage for the pile. For example each pile engaging device comprises a suspension arm that is pivotal about a horizontal axis, here as preferred from a top end of the arm, relative to a chassis of the device that is supported on the track structure.

In an embodiment a suspension arm actuator, e.g. a hydraulic cylinder, is provided between the chassis and the arm to adjust the radial position of the roller(s).

In an embodiment each chassis here is provided with a motorized drive adapted to move the chassis along, possibly a section of, the circular track structure so as to adjust the angular position of the device.

A further method comprises the steps:
- after rotating the pile over a first angle, engaging the pile with secondary pile engaging devices and releasing the pile with the primary engaging devices; and
- moving the primary pile engaging devices in a backward direction along the track structures;
- engage the pile with the primary pile engaging devices and release the pile with the secondary pile engaging devices; and
- moving the primary pile engaging devices in a forward direction along the track structures, and thus rotating the pile about its longitudinal axis.

An alternative method comprises the steps;
- after rotating the pile over a first angle, engaging the pile with secondary pile engaging devices and releasing the pile with the primary engaging devices; and
- moving the secondary pile engaging devices in a forward direction along the track structures, and thus rotating the pile about its longitudinal axis;
- moving the primary pile engaging devices in a backward direction along the track structures;
- engage the pile with the primary pile engaging devices and release the pile with the secondary pile engaging devices; and
- moving the primary pile engaging devices in a forward direction along the track structures, and thus rotating the pile about its longitudinal axis.

The invention furthermore provides a vessel comprising a pile holder, preferably comprising a pile holding system mounted on a deck of the vessel, e.g. for installation of a pile adapted to support an offshore wind turbine, which pile holding system comprises a pile holder according to the second aspect of the invention.

The invention furthermore provides a use of a vessel according to the first and/or according to the second aspect of the invention.

It will be appreciated that the benefits of the pile holder according to the second aspect of the invention can be combined with the pile holding system according to the first aspect of the invention. Equally all embodiments as discussed above of the pile holder according to the second aspect of the invention, as well as each and every other technical feature address with reference to the first aspect of the present invention can be combined, e.g. in various combinations of such features.

Whilst primarily presented for illustrative purposes with reference to one or more of the figures, any of the technical features addressed below may be combined with any of the independent claims of this application either alone or in any other technically possible combination with one or more other technical features.

Figure 2:
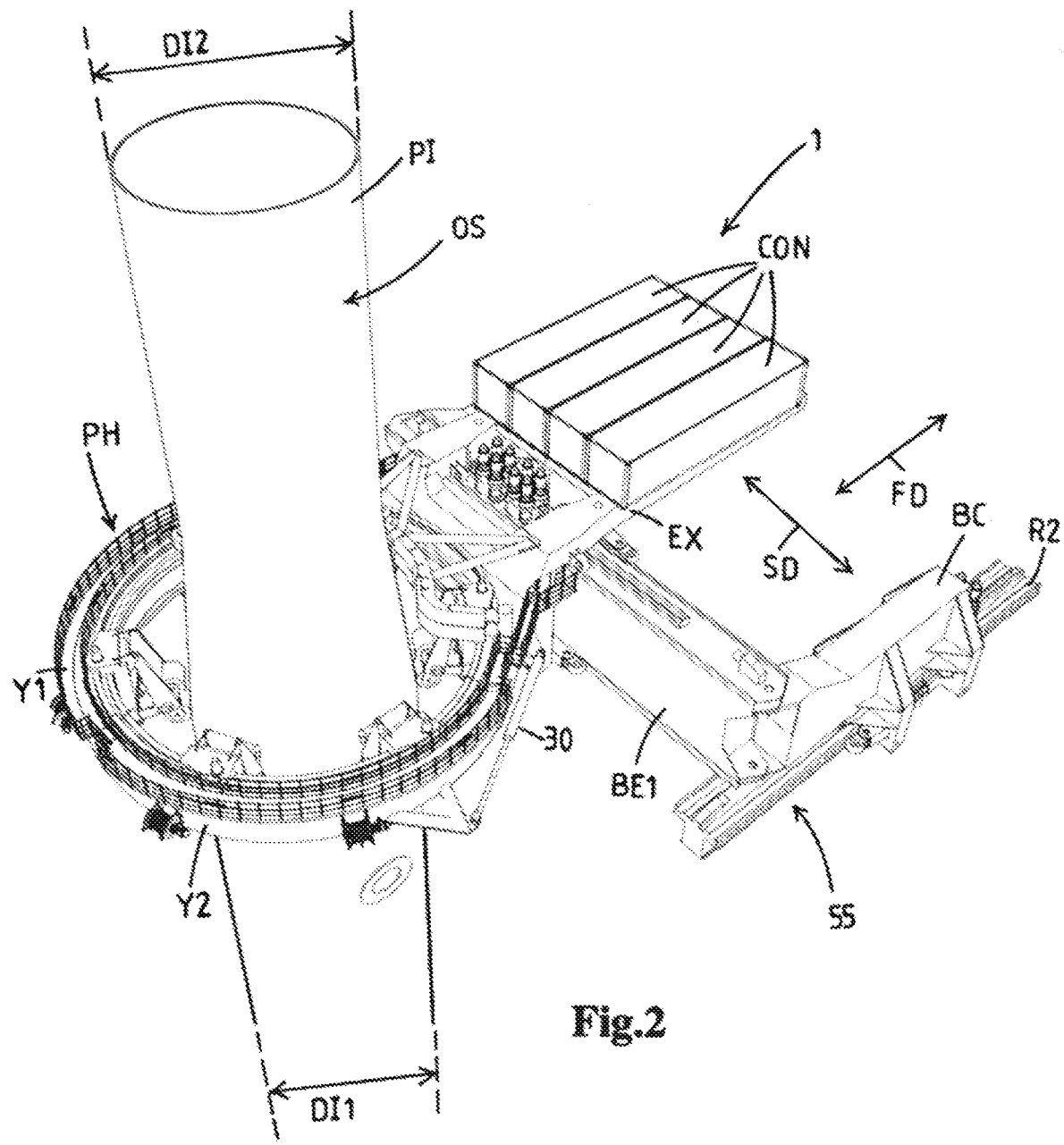
Figure 3:
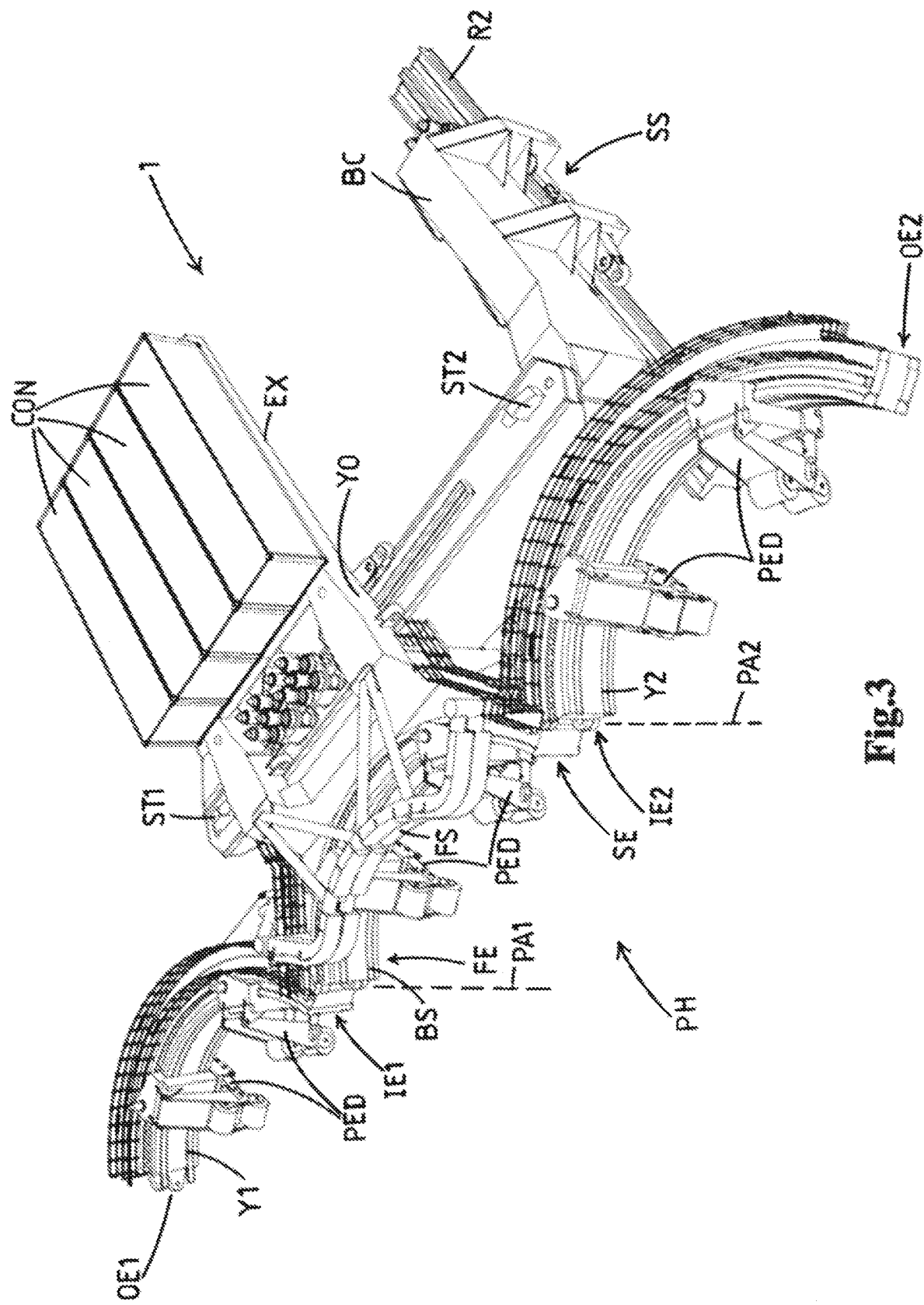
Figure 4:
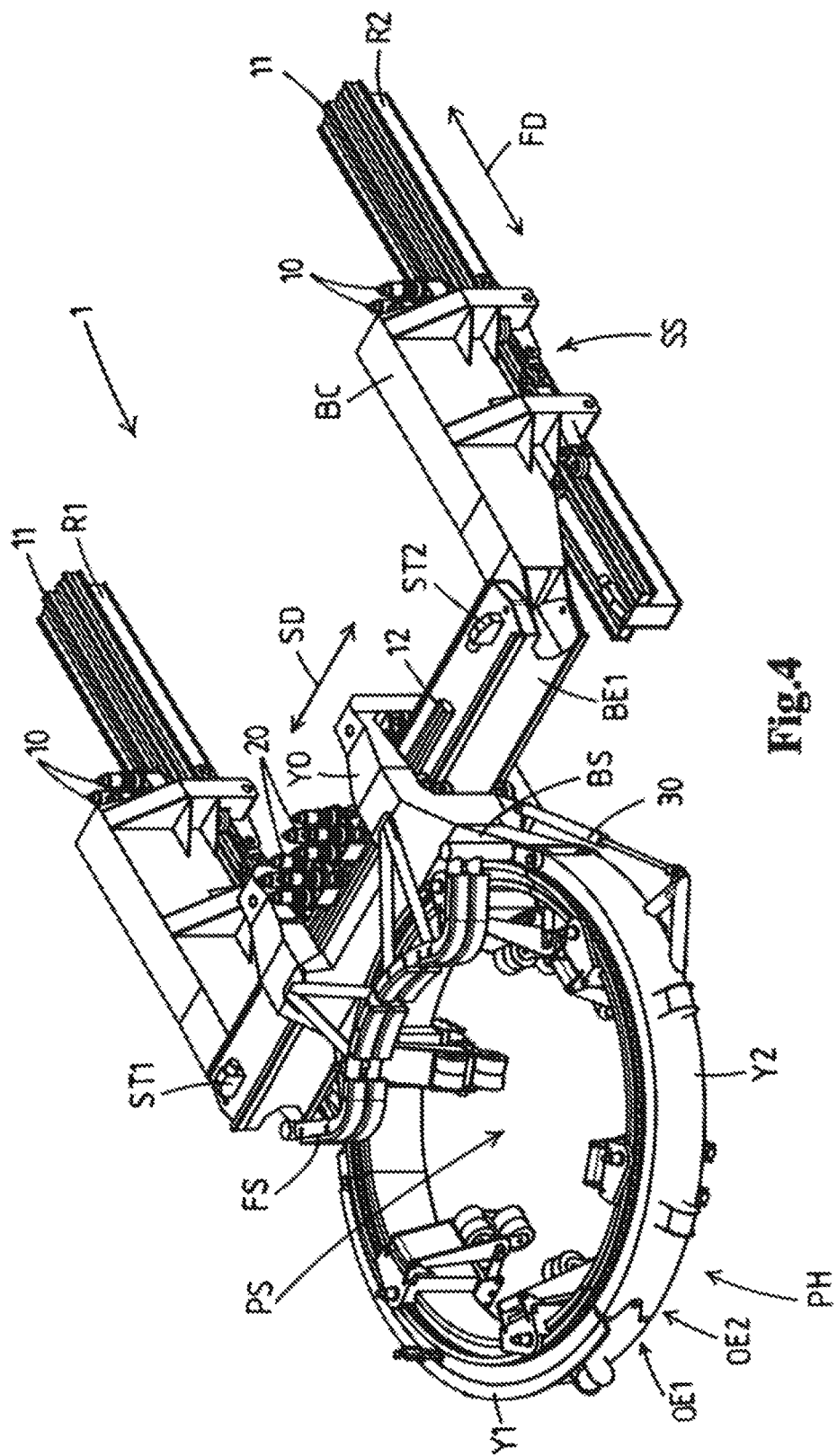
Figure 5:
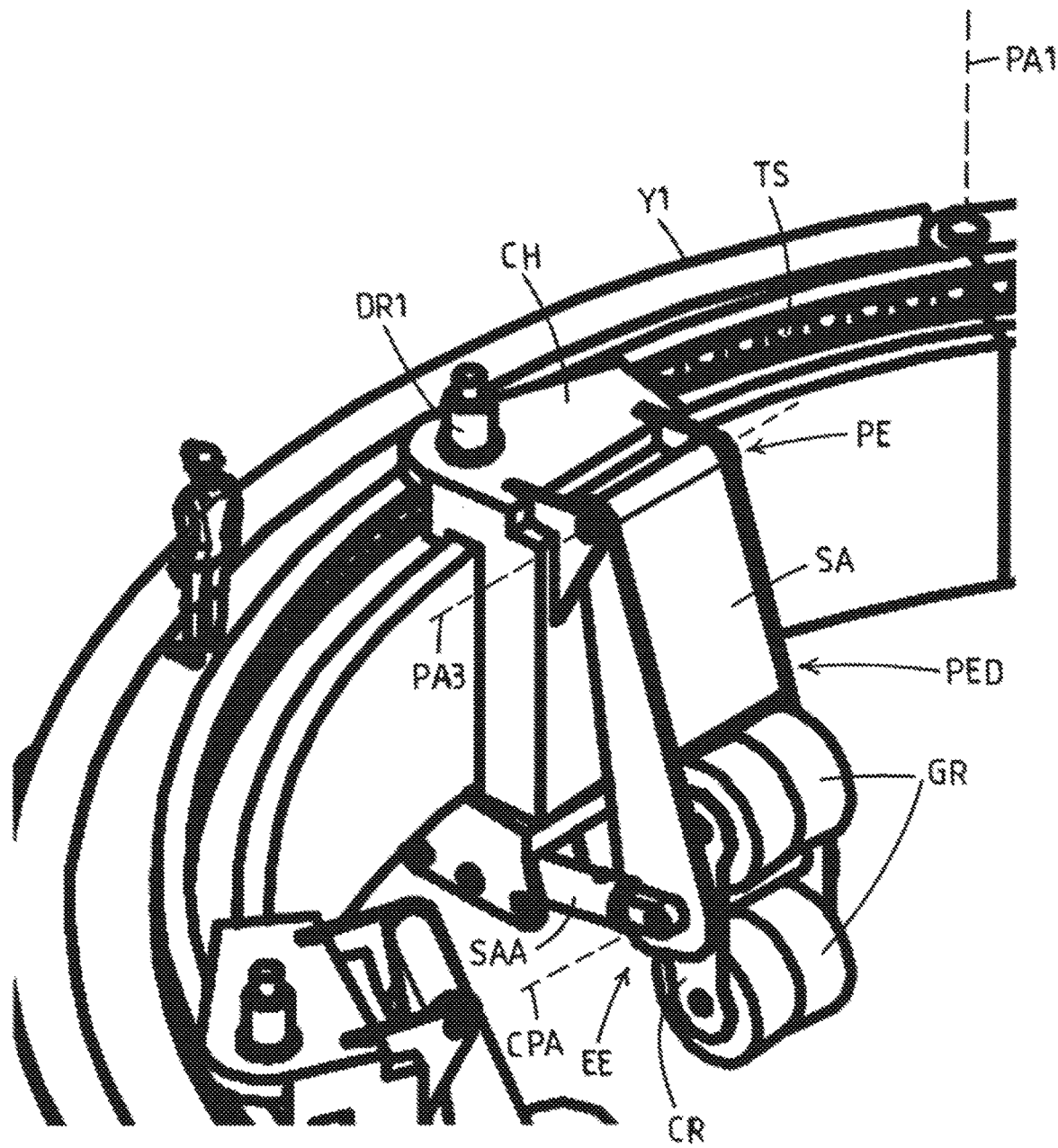
Figure 6:
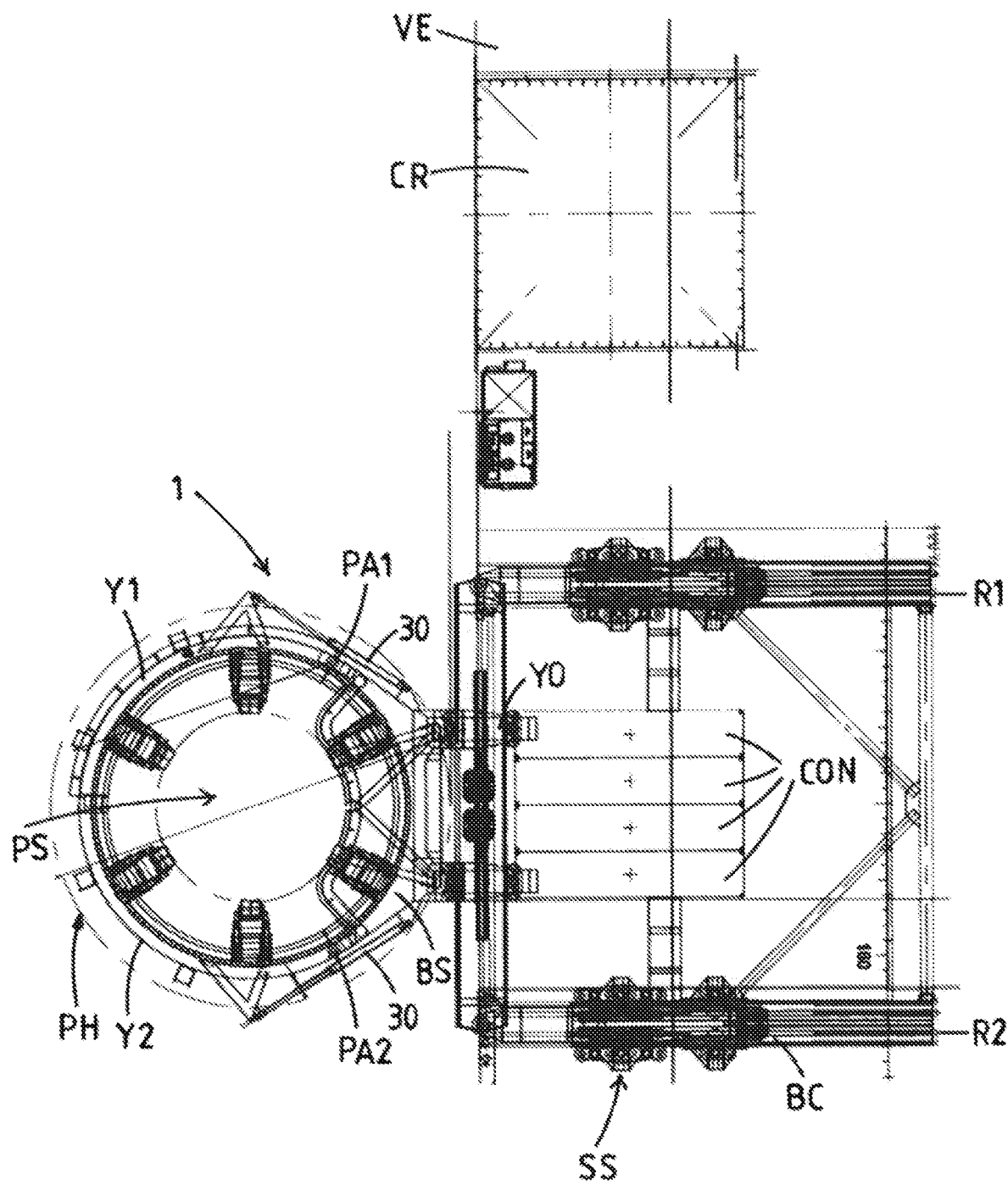
Figure 7:
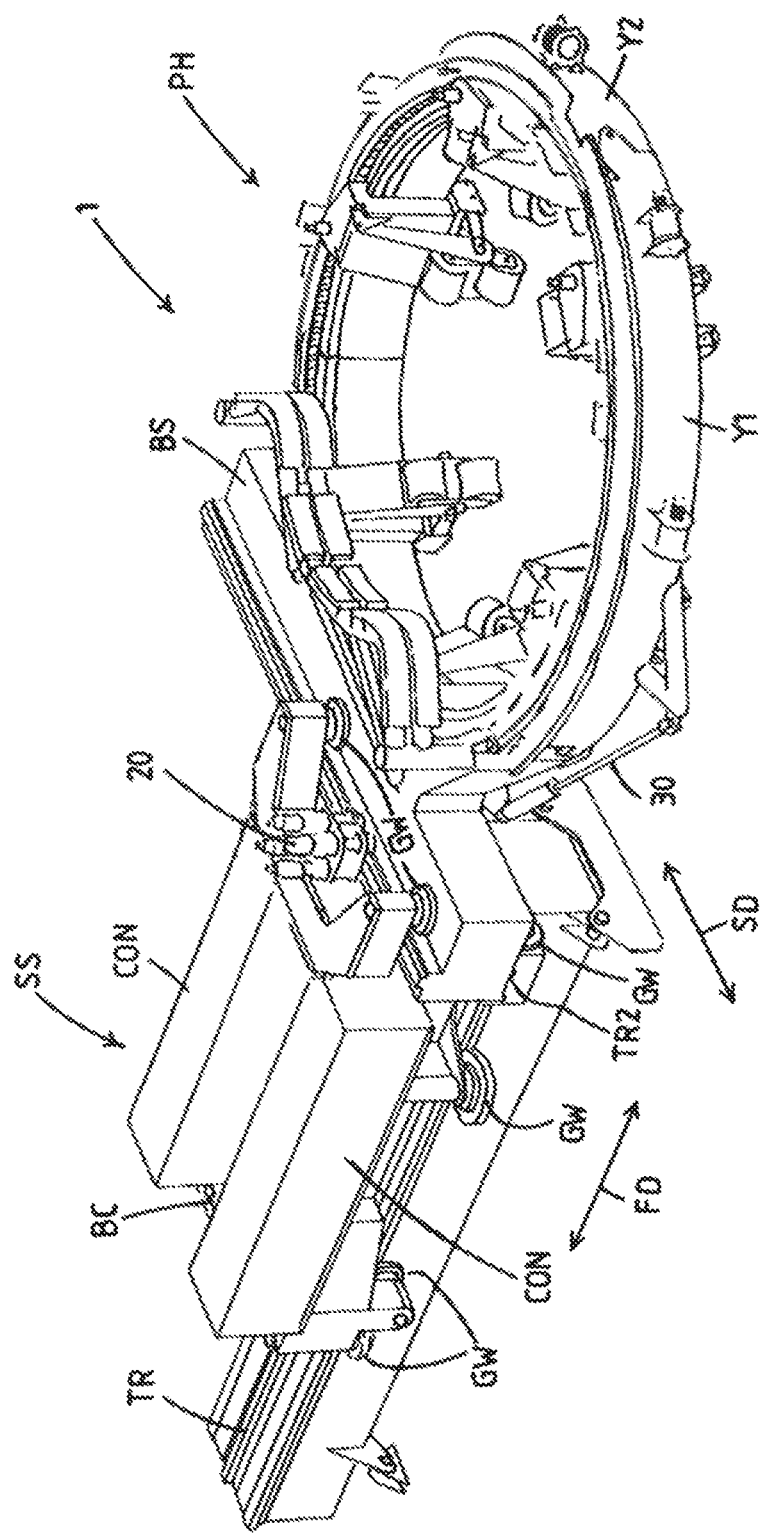
Figure 8:
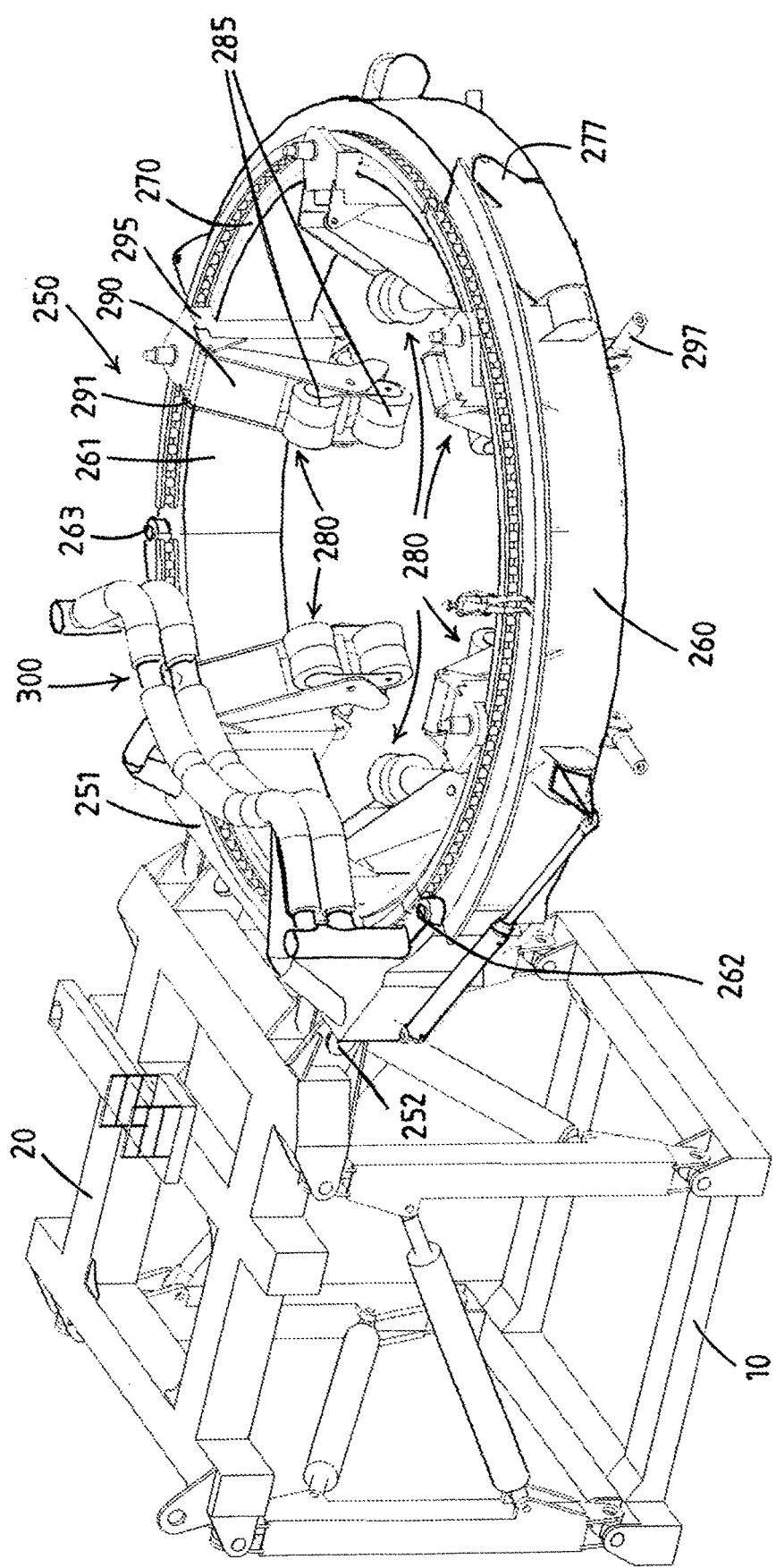

The invention will now be described in a non-limiting way by reference to the accompanying drawings in which like parts are indicated using like reference symbols, and in which:

FIG. 1 schematically depicts a vessel according to an embodiment of the invention:

FIG. 2 schematically depicts in more detail the pile holding system shown in FIG. 1;

FIG. 3 schematically depicts the pile holding system of FIG. 2 in an open configuration:

FIG. 4 schematically depicts the pile holding system of FIG. 2 in an closed configuration:

FIG. 5 schematically depicts in more detail a pile engaging device of the pile holding system of FIG. 2;

FIG. 6 schematically depicts a top view of a part of the vessel of FIG. 1;

FIG. 7 schematically depicts a pile holding system according to another embodiment of the invention; and FIG. 8 depicts another embodiment of a pile holder according to the second aspect of the invention.

FIGS. 1-6 all relate to the same embodiment of a pile holding system 1 according to the invention. FIG. 1 depicts the pile holding system 1 on a vessel VE while handling a pile PI. FIG. 2 depicts the pile holding system 1 and the pile PI in more detail while omitting the vessel VE. FIG. 3 depicts the pile holding system 1 in an open configuration which will be described below in more detail. FIG. 4 depicts the pile holding system 1 in a closed configuration which will be described below in more detail. FIG. 5 depicts in more detail a pile engaging device of the pile holding system 1. And FIG. 6 depicts a top view of the pile holding system 1 and the portion of the vessel in the direct vicinity of the pile holding system 1.

The vessel VE includes a hull HU with at least one deck DE. The deck DE provides sufficient space to store, in this case, five piles PI in a horizontal orientation. The piles PI are preferably stored such that their longitudinal axes are parallel to a longitudinal axis of the vessel VE. The longitudinal axis of the vessel extending between a bow and an aft (i.e. stem) of the vessel.

In this embodiment, the vessel VE is a monohull vessel, but alternatively, the vessel VE could be a semi-submersible. In a non-shown embodiment, the vessel VE is a jack-up type vessel in which legs can be lowered into the water to lift the vessel at least partially out of the water so that waves have a limited or minimal effect on the vessel. The vessel can then e.g. be used in floating condition when the weather and wave conditions are good and can be used in jack-up condition when the weather and wave conditions are bad.

The pile holding system 1 is in this embodied arranged at a side of the vessel, in this embodiment the starboard side of the vessel VE to hold the pile PI outside the contour of the vessel VE at a starboard side seen from above. Alternatively, the pile holding system 1 may be arranged at a stem of the vessel to hold a pile PI outside the contour of the vessel at a stem side of the vessel seen from above.

In this embodiment, a crane CR is arranged next to the pile holding system 1. The crane CR is configured to handle a pile PI, wherein handling may include lifting a pile PI from its storage location, upending the pile PI, positioning the pile PI relative to the pile holding system 1, and lowering the pile PI to the sea floor. However, the crane CR may also be configured to handle a pile driving mechanism PDM, which pile driving mechanism PDM is configured to actively drive the pile PI deeper into the sea bottom by applying downwardly directed forces to an upper end portion of the pile PI.

In an embodiment, when the pile PI is lowered into the water, the pile PI is initially held by the crane CR and gravity force will initially drive the pile PI into the sea bottom when the pile PI reaches the sea bottom. When lowering based on gravity stops, the crane CR can be disengaged from the pile PI and the pile driving mechanism PDM can be lifted from its storage position to be positioned on top of the pile PI to drive the pile PI deeper into the sea bottom. It is noted here that the sea bottom may alternatively be referred to as the sea floor.

The storage location of the pile driving mechanism PDM may be at the port side of the vessel as in this embodiment to serve as a counterweight during handling of a pile PI by the crane CR outside the contour of the vessel.

In case the pile holding system 1 and crane CR are arranged at the stem of the vessel, it is preferred that the crane is arranged in line with a centre of gravity of the vessel VE and the pile holding system 1 is arranged next to the crane. In such a case, it is preferred that the storage location for the pile driving mechanism is at a side of the crane CR opposite to the side where the pile holding system is arranged.

The vessel VE may also comprise deck space to store other equipment, e.g. pile extensions PX that are configured to be connected to a free upper end of a pile PI and that are configured to support a mast of an offshore wind turbine.

In FIG. 1, the pile holding system 1 holds the pile PI in an upright position at a pile installation location next to the vessel VE, i.e. outside the contour of the vessel. In FIG. 1, the pile has passively penetrated the sea bottom due to gravity and the crane CR is in the process of lifting the pile driving mechanism PDM in order to position the pile driving mechanism PDM on the pile PI for actively driving the pile PI further into the sea bottom. Although the pile PI is not held anymore by the crane CR, the pile holding system 1 still limits movement of the pile PI in a horizontal direction. This will be described below in more detail, but first the pile holding system 1 itself will be described in more detail.

The pile holding system 1 comprises a pile holder PH with a base structure BS, a first jaw Y1 and a second jaw Y2. In FIG. 3, an inner end IE1 and outer end OE1 of the first jaw Y1 and an inner end IE2 and outer end OE2 of the second jaw Y2 are indicated to show that the first jaw extends between the inner end IE1 and the outer end OE1, and the second jaw extends between the inner end IE2 and the outer end OE2. Also shown in FIG. 3 is that the base structure BS extends between a first end FE and a second end SE.

As can be clearly seen in FIG. 1, the first jaw Y1 is pivotably connected with its inner end IE1 to the first end FE of the base structure BS to pivot about a first jaw pivot axis PA1, and the second jaw Y2 is pivotably connected with its inner end IE2 to the second end SE of the base structure BS to pivot about a second jaw pivot axis PA2. Both the first jaw Y1 and the second jaw Y2 are pivotable between a respective closed position as shown in FIGS. 1, 2, 4 and 5 and an open position as shown in FIG. 3.

In this embodiment, the base structure BS, first jaw Y1 and second jaw Y2 are similar in size. i.e. they all extend along a 120 degree arc-shaped trajectory to from a circular segment. This can be best seen in FIG. 3 in which the first and second jaws Y1, Y2 are in the open position.

FIG. 4 clearly depicts that when the first jaw Y1 and the second jaw Y2 are in the closed position, the outer ends OE1, OE2 of the first and second jaws Y1, Y2 join up, even engage each other, and preferably are connected to each other, e.g. using a locking mechanism to lock the first jaw Y1 and the second jaw Y2 in their closed positions. Although locking the jaws Y1, Y2 in their closed positions can be achieved by connecting the outer ends OE1, OE2 to each other, it is alternatively also envisaged that the jaws are locked in their closed positions by a locking mechanism without being connected to each other.

In the closed position, the pile holder PH defines a pile passage PS for the pile PI. In FIGS. 1 and 2, the pile PI is positioned in the pile passage PS, which pile may alternatively be described as being positioned in the pile holder PH. Being positioned in the pile holder thus implies that the jaws Y1 and Y2 are in the closed position to form the pile passage PS.

In the open position, the pile PI is allowed to move from and to the pile holder PI in a lateral direction, i.e. in this case the lateral direction is in a plane spanned by the base structure BS, the first jaw Y1 and the second jaw Y2. This moving option may alternatively be described as being allowed to be received in, or to be removed from, the pile holder in a lateral direction.

The pile holding system 1 further comprises a plurality of pile engaging devices PED, wherein in this embodiment, the base structure BS, the first jaw Y1 and the second jaw Y2 each support two pile engaging devices PED. The pile engaging devices PED are configured to engage with an outer surface OS of a pile PI when the pile PI is positioned in the pile holder PH. To reduce friction between the pile engaging devices PED and the pile PI during lowering of the pile PI relative to the pile holder PH, the pile engaging devices PED are preferably provided with one or more pile guiding rollers GR as indicated in FIG. 5.

The base structure BS of the pile holder PH comprises a yoke YO, which yoke YO is moveably supported by a support system SS mounted on the deck DE of the vessel.

The support system SS is configured to move the pile holder PH in a first direction FD between an inboard position as depicted in FIG. 3 and an outboard position as depicted in FIGS. 1, 2, 4 and 6.

In the outboard position, the pile holder PH is located outside the contour of the vessel VE for holding the pile PI in the upright position at the installation location. In the inboard position with the first jaw Y1 and the second jaw Y2 in the open position, the pile holder PH is located within the contour of the vessel.

In this embodiment, the first direction FD is a substantially horizontal direction. The support system SS comprises a track formed by rails R1, R2 mounted on the deck DE of the vessel.

The rails R1, R2 extend in the first direction FD and support a base carriage BC for movement along the track in the first direction FD.

The yoke YO is moveably supported by the base carriage BC for moving the pile holder PH in a second direction SD, which second direction is in this embodiment also a substantially horizontal direction perpendicular to the first direction FD. The movability of the yoke YO allows to move the pile holder PH between a first outer position, in which the yoke YO engages with a first stopper ST1 on the beam BE1 of the base carriage BC, and a second outer position, in which the yoke YO engages with a second stopper ST2 on the beam BE1 of the base carriage BC. In the FIGS. 1, 2 and 3, the pile holder PH is near the 3 first outer position, and in the FIGS. 4 and 6, the pile holder PH is positioned halfway the first and second outer position.

An advantage of the moveability in both the first and second direction FD, SD, is that the support system is able to position the pile holder in a horizontal plane relative to the vessel. This in turn allows to provide active motion compensation in said horizontal plane while the pile holder supports a pile PI in the upright position at the installation location next to the vessel to compensate for movement of the vessel relative to the pile installation location.

The pile holding system 1 further comprises an actuation system including base carriage actuation devices 10, yoke actuation devices 20, and jaw actuation devices 30.

The base carriage actuation devices 10 are arranged on the base carriage BC of the support system to cooperate with a rack 11 on the respective rails R1, R2. Driving the base carriage actuation devices 10 will result in movement of the base carriage BC relative to the rails R1, R2 in the first direction FD.

The yoke actuation devices 20 are arranged on the yoke YO to cooperate with a rack 12 on the beam BE1 of the base carriage BC. Driving the yoke actuation devices 10 will result in movement of the yoke YO and thus the pile holder PH relative to the base carriage in the second direction SD.

The jaw actuation devices 30 are in this case hydraulic cylinders 30 arranged between the base structure BS and the first jaw Y1 and the second jaw Y2, respectively. Driving the jaw actuation devices allows to move the corresponding first or second jaw Y1, Y2 between its open position and its closed position.

The pile holding system 1 preferably comprises a control system to control movement of the pile holder PH based on user and/or sensor input by sending corresponding driving signals to the actuation system.

FIG. 5 depicts in more detail a pile engaging device PED as described above. In FIG. 5, the pile engaging device PED is associated with the first jaw Y1, but the description below also applies to the other pile engaging devices PED.

The pile engaging device PED comprises a chassis CH moveably supported on a track structure TS arranged on the first jaw Y1. The track structure TS which may be embodied as a rack or rail section extends in this embodiment along a longitudinal direction of the first jaw Y1. A drive DR1, preferably part of the actuation system and controlled by the control system, is provided, which drive DR1 is adapted to move the chassis CH along the track structure.

The pile engaging device PED further comprises a suspension arm SA having an engaging end EE and a pivot end PE, wherein the suspension arm SA is at the pivot end PE pivotable supported, such that the suspension arm SA is pivotable about a pivot axis PA3. Preferably, as in this embodiment, the pivot end PE is a top end of the suspension arm and the pivot axis PA3 preferably is a horizontal pivot axis. The suspension arm SA is at the engaging end EE provided with one or more pile engaging elements in the form of pile guiding rollers GR. The pile engaging device PED further comprises a suspension arm actuator SAA, which may be part of the actuation system and be controlled by the control system, to position the suspension arm at different angular positions about the pivot axis PA3. This allows to move and position the pile engaging elements GR of a pile engaging device PED in a radial direction relative to the first jaw, second jaw or base structure. An advantage thereof is that when the first and second jaws are in their closed positions, all pile engaging devices can simultaneously engage with piles having different diameters. It is also possible to adjust the position of the pile engaging device in radial direction to adjust to different diameters used in a single pile, e.g. when the pile tapers inwards at the upper end thereof as shown in FIG. 2, where a main portion of the pile has a diameter DI1 and an upper end of the pile has a diameter DI2, and where DI1>DI2. The drive DR1 and corresponding track structures allow to move and position the pile engaging devices in a tangential direction, which has the advantage that an obstruction or protrusion on the outer surface OS of the pile can be circumvented by the pile engaging devices during lowering of the pile.

The pile engaging device PED in FIG. 5 further comprises a carrier CR supporting two guiding rollers GR, which carrier is pivotably connected to a support end, i.e. the engaging end EE in this embodiment, of the suspension arm SA to pivot about a carrier pivot axis CPA. The carrier pivot axis CPA preferably extends parallel to the suspension arm pivot axis PA3.

The pile holding system further comprises a fender structure FS, in this case mounted on the base structure BS, for rough positioning of the pile PI when the pile PI is positioned in the pile passage PS and/or for collision prevention between pile and other pile holder portions, e.g. the pile engaging devices on the base structure.

In this embodiment, the yoke YO comprises an extension EX for supporting equipment, here embodied as containers CON. The containers CON may contain equipment used for operating the pile holding systems such as electric or hydraulic drives, gear boxes, winches, etc., but may also be used for storage of other equipment. The use of the extension to support equipment can be advantageously be used to provide a counterweight for the pile holder PH to reduce loads on the yoke YO and/or beam BE1. The extension EX and containers CON have been omitted in FIG. 4.

The embodiment shown in FIGS. 1-6 allow to carry out a method for installation of a pile adapted to support an offshore wind turbine, wherein use is made of the vessel VE, and wherein the method includes the step of transporting a pile PI to the offshore pile installation location. As the vessel VE comprises storage locations for piles, the vessel itself may carry out this step, but the piles may also be transported using a separate vessel, e.g. when the vessel VE runs out of piles PI.

The pile installation location is outside of the contour of the vessel. The pile holder PH is moved from the inboard position to the outboard position and the first and second jaws Y1, Y2 are positioned in the open position. This makes the pile holder ready for receiving a pile.

A pile PI is lifted at an upper end thereof and positioned in the pile holder PH. Positioning the pile PI in the pile holder may be carried out in different ways, including:
1. positioning the pile at the pile installation location and subsequently moving the pile holder towards the pile until the fender structure FS engages with the pile;
2. positioning the pile holder at the pile installation location and subsequently moving the pile towards the pile holder until the fender structure FS engages with the pile; and
3. simultaneously moving the pile holder and the pile towards each other at the pile installation location until the fender structure engages with the pile.

In an alternative embodiment, e.g. when the pile holder does not have a fender structure, positioning the pile in the pile holder may be carried out until the pile engages with the pile engaging devices arranged on the base structure. Positioning and moving the pile in the pile holder preferably involves motion in a sideways direction. i.e. a substantially horizontal direction not excluding motion in any other direction.

Once the pile is positioned in the pile holder, the first jaw Y1 and the second jaw Y2 can be moved to their closed positions to hold the pile in the pile passage.

The pile can now be lowered to the sea floor while being held by the pile holder. The crane CR may be used to handle the pile. When the pile reaches the sea floor, gravity forces will initially drive the pile into the sea floor. When this process stops, the crane can be disengaged from the pile and the pile driving mechanism PDM can be used to actively drive the pile into the sea floor preferably while being held by the pile holder.

FIG. 7 depicts a pile holding system 1 according to another embodiment of the invention. The pile holder PH is similar to the pile holder of the embodiment of FIGS. 1-6 and will not be described in detail here to prevent unduly repetition of features and embodiments.

The main difference between the two embodiments is the support system SS and the connection thereof to the base structure BS of the pile holder PH.

Also in this embodiment of FIG. 7, the support system is configured to be mounted on the deck DE of a vessel VE. The support system SS is configured to move the pile holder PH in a first direction between an inboard position and an outboard position.

In this embodiment, the first direction FD is a substantially horizontal direction. The support system SS comprises a track TR mounted on the deck DE of the vessel. The track TR extend in the first direction FD and support a base carriage BC for movement along the track in the first direction FD.

Where in FIGS. 1-6, the base carriage has a substantially U-shaped form seen in plan view and the yoke YO of the base structure is moveable along the beam BE1 forming the connection between the legs of the U-shape, the base carriage BC of FIG. 7 has a substantially T-shaped form seen in plan view. The part of the base carriage corresponding to the vertical bar of the T-shape engages with the track TR for moving in the first direction while the part of the base carriage BC corresponding to the horizontal bar of the T-shape forms another track TR2 extending in the second direction to engage with the base structure BS of the pile holder PH for moving in the second direction.

An advantage of this embodiment is that the required deck space for the support system is relatively small due to the slender design of the track TR and corresponding base carriage BC. Another advantage may be that the containers CON with equipment can be easier arranged on the base carriage itself.

It will be apparent for the skilled person that sufficient measures have to be taken to moveably connect the base structure BS to the other track TR2 and to moveably connect the base carriage to the track TR. To this end, guiding elements, such as guiding wheels GW may be provided.

It is submitted that FIG. 3 and FIG. 7 depict an embodiment of a pile holder according to the second aspect of the invention, which pile holder in the embodiment shown is supported on a pile holder support system to be mounted on a vessel, e.g. for installation of a pile adapted to support an offshore wind turbine according to the first aspect of the invention.

The Pile holder PH, for use in a pile holding system to be mounted on a deck of a vessel, e.g. for installation of a pile adapted to support an offshore wind turbine, comprises a base structure BS, a first jaw Y1, a second jaw Y2, track structures TS, and pile engaging devices PED. In the particular embodiment shown, the pile holder is provided with three primary pile engaging devices and three secondary pile engaging devices.

The first jaw Y1 and the second jaw Y2 each extend between an inner end IE1 and an outer end OE1, The inner end IE1 and outer end OE1 of the first jaw Y1 and an inner end IE2 and outer end OE2 of the second jaw Y2 are indicated to show that the first jaw extends between the inner end IE1 and the outer end OE1, and the second jaw extends between the inner end IE2 and the outer end OE2. The base structure BS extends between a first end FE and a second end SE.

The first jaw Y1 and the second jaw Y2 are pivotable connected at the inner end thereof to a respective pivot part of the base structure BS. The first jaw Y1 is pivotably connected with its inner end IE1 to the first end FE of the base structure BS to pivot about a first jaw pivot axis PA1, and the second jaw Y2 is pivotably connected with its inner end IE2 to the second end SE of the base structure BS to pivot about a second jaw pivot axis PA2. Both the first jaw Y1 and the second jaw Y2 are pivotable between a respective closed position as shown in FIGS. 1, 2, 4 and 5 and an open position as shown in FIG. 3.

In the closed position the pile holder defines a pile passage for the pile held in the pile holder. In the open position, the jaws allow the pile to be received in, or to be removed from, the pile holder in a lateral direction.

The pile engaging devices PED comprise a chassis CH moveably supported on a track structure TS arranged on the pile holder PH. The track structures are comprised in the first jaw and the second jaw, and in the embodiment shown, in the base structure. The track structures extend along a longitudinal direction of the respective first jaw, second jaw and base structure.

The track structures TS may be embodied as a rack or rail section. The track structures in the embodiment shown extends along a longitudinal direction of the first jaw Y1 the second jaw Y2 and the base structure BS. A drive DR1, preferably part of the actuation system and controlled by the control system, is provided, which drive DR1 is adapted to move the chassis CH of the pile engaging devices, more in particular the pile engaging elements, along the respective track structures, and thus along an inner circumference of the pile holder while engaging a pile, to rotate a pile supported by a crane in the pile holder about its longitudinal axis.

In the embodiment shown, both the primary and the secondary pile engaging devices comprise a chassis, which chassis is moveably supported on one of the track structures. Each chassis is provided with a drive adapted to move the chassis along the track structure, and therefore move the pile engaging devices, more in particular the pile engaging elements, along an inner circumference of the pile holder while engaging a pile, to rotate a pile supported by a crane in the pile holder about its longitudinal axis.

The pile engaging devices furthermore each comprise a chassis, one or more pile engaging elements, e.g. each comprise one or more pile guiding rollers for engaging the pile in the pile passage, and an actuator to move the one or more pile engaging elements between an active position and a passive position for respectively engaging and releasing the pile located in the pile holder, and to allow simultaneous engagement of all primary pile engaging devices with piles having different diameters, when the pile engaging elements are in the active position and the first and second jaws are in their closed positions, The secondary pile engaging devices are interposed between the primary pile engaging devices, such that along the circumference of the pile holder, the primary engaging devices alternate with the secondary engaging devices. Thus the pile holder comprises two groups of three pile engaging devices.

The pile holding system further comprises a control system configured to control the drives of the pile engaging devices, and to drive the pile engaging devices in unison along the track structures. In the particular embodiment shown, the control system of the pile holding system is configured to control the drives of the primary pile engaging devices, and to drive the primary pile engaging device in unison along the track structures, and to control the drives of the secondary pile engaging devices, and to drive the secondary pile engaging devices in unison along the track structures, Thus, in the embodiment shown, a pile supported in the pile holder can be rotated by both the primary pile engaging devices and the secondary pile engaging devices. This is for example beneficial when a surface feature of the pile is aligned with one of the primary pile engaging devices, preventing that pile engaging device from engaging the pile. In such a situation, the secondary pile engaging devices can be used, instead of the primary pile engaging devices, to engage and rotate the pile over a first angle. Once the pile has been rotated by the secondary pile engaging devices, the surface feature may have been moved sufficiently for the primary pile engaging devices to engage the pile and rotate the pile over a second angle.

FIG. 8 depicts another embodiment of a pile holder according to the second aspect of the invention, which pile holder in the embodiment shown is supported on a wave-induced motion compensated pile holder support system to be mounted on a vessel, e.g. for installation of a pile adapted to support an offshore wind turbine.

The system comprises:
a base frame 110 to be mounted on the vessel;
a support frame 120 arranged above the base frame at a distance thereof;
a support system for moveably supporting the support frame from the base frame having an active motion compensated actuation system for moving the support frame relative to the base frame, e.g. as described herein already.

The pile holder 250 comprises a base structure 251 mounted to the support frame 20. In this embodiment, the base structure 251 is pivotally mounted to the support frame 20 to pivot relative to the support frame 20 about base pivot axis 252 between a substantially vertical orientation and a substantially horizontal orientation. In this example it is envisaged that this tilting is only in view of sailing with the vessel, mooring in a port, etc., as it is envisaged that a pile is hoisted by a crane and placed in vertical orientation before engagement thereof by the pile holder 250.

The pile holder 250 has an annular structure of which a section is formed by the base structure 251, and of which the remainder is formed by two semi-circular jaws 260, 261. These jaws 260, 261 are each pivotally connected at an inner end thereof to a respective pivot part of the base structure 251 and pivotal about a pivot axis 262, 263 between a closed position, wherein outer ends of the jaws 260, 261 join up, and an opened position. The actuation of each jaw 260, 261 is done by a jaw actuator, e.g. a hydraulic cylinder 265.

A locking mechanism 277 is preferably provided to lock the outer ends of the semi-circular jaws 260, 261 to one another.

The annular structure of the pile holder 250, as preferred, is provided with a circular support track structure 270 that carries multiple pile engaging devices 280, e.g. three primary pile engaging devices and three secondary pile engaging devices, here with pile guiding rollers 285, e.g. four or more, here six, of such devices.

The pile engaging devices 280 are movable along the circular support track structure, at least one or more of them, at least over an arc segment of the circle, so as to allow for adaptation of the angular position of the pile engaging devices 280 relative to the passage for the pile.

Each pile engaging device 280, as preferred, carries one or more pile engaging elements, here a pair of two pile guiding rollers 285 in a movable manner allow for adjustment of the radial position of the rollers 285 relative to the passage for the pile. Here each pile engaging device comprises a suspension arm 290 that pivotal about a horizontal axis 291, here as preferred from a top end of the arm 290, relative to a chassis 295 of the device that is supported on the track structure 270.

A suspension arm actuator, here a hydraulic cylinder 297, is provided between the chassis 295 and the arm 290 to adjust the radial position of the roller(s) 285.

Each chassis 295 here is provided with a motorized drive adapted to move the chassis 295 along, possibly a section of, the circular track structure so as to adjust the angular position of the device 280.

A fender structure 300 is mounted here, as preferred, on the base structure. e.g. in view of a rough positioning of the pile relative to the pile holder.

The invention claimed is:

1. A pile holder for use in a pile holding system to be mounted on a deck of a vessel, the pile holding system being configured to support a pile in an upright position at a pile installation location next to the vessel, wherein the pile holder comprises:
   a base structure, a first jaw and a second jaw, the first jaw and the second jaw each extending between an inner end and an outer end, wherein the first and the second jaw are pivotably connected at the inner end thereof to a respective pivot part of the base structure to pivot about a jaw pivot axis between a closed position, in which the pile holder defines a pile passage for the pile held in the pile holder, and an open position, to allow the pile to be received in, or to be removed from, the pile holder in a lateral direction, and wherein the first and second jaws comprise track structures extending along a longitudinal direction of the respective first jaw, or second jaw; and
   three primary pile engaging devices, wherein the primary pile engaging devices each comprise a chassis, one or more pile engaging elements, and an actuator to move the one or more pile engaging elements between an active position and a passive position for respectively engaging and releasing the pile located in the pile holder, and to allow simultaneous engagement of all primary pile engaging devices with piles having different diameters, when the pile engaging elements are in the active position and the first and second jaws are in their closed positions,
   wherein the primary pile engaging devices further comprise a chassis, the chassis of each of the primary pile engaging devices being moveably supported on one of the track structures,
   wherein each chassis is provided with a drive adapted to move the chassis along the track structure, and therefore move the pile engaging devices along an inner circumference of the pile holder while engaging a pile, to rotate a pile supported by a crane in the pile holder about a longitudinal axis thereof, and
   wherein the pile holding system further comprises a control system configured to control the drives of the primary pile engaging devices, and to drive the primary pile engaging device in unison along the track structures.

2. The pile holder according to claim 1, wherein the pile holder further comprises three secondary pile engaging devices for engaging a pile when the primary pile engaging devices are in the passive position, wherein the secondary pile engaging devices each comprise one or more pile engaging elements, and an actuator to move the one or more pile engaging elements between an active position and a passive position for respectively engaging and releasing the pile located in the pile holder, and to allow simultaneous engagement of all secondary pile engaging devices with piles having different diameters, when the pile engaging elements are in the active position and the first and second jaws are in their closed positions.

3. The pile holder according to claim 2, wherein the secondary pile engaging devices further comprise a chassis, the chassis of each of the secondary pile engaging devices being moveably supported on one of the track structures.

4. The pile holder according to claim 3, wherein each track structure supports at least one primary pile engaging device and at least one secondary pile engaging device.

5. The pile holder according to claim 2, wherein the track structures form a ring shaped track, extending along a full inner circumference of the pile holder, the ring shape track supporting the primary pile engaging devices and the secondary pile engaging devices.

6. The pile holder according to claim 2, wherein the primary pile engaging devices, and the secondary pile engaging devices, each comprise a suspension arm, each suspension arm having an engaging end and a pivot end, wherein the suspension arm is at the pivot end pivotably supported, such that the suspension arm is pivotable about a pivot axis, and wherein each suspension arm is at the engaging end provided with one or more pile engaging elements.

7. The pile holding system according to claim 6, wherein each pile engaging device comprises a suspension arm actuator to position the suspension arm at different angular positions about the pivot axis to allow simultaneous engagement of all pile engaging devices with corresponding piles having different diameters when the first and second jaws are in their closed positions.

8. The pile holding system according to claim 7, wherein the suspension arm actuator is provided between the chassis and the suspension arm.

9. The pile holder according to claim 2, wherein each track structure supports at least one primary pile engaging device and at least one secondary pile engaging device.

10. The pile holder according to claim 2, wherein the control system is configured to control the drives of the secondary pile engaging devices, and to drive the secondary pile engaging device in unison along the track structures.

11. The pile holder according to claim 2, wherein the secondary pile engaging devices are interposed between the primary pile engaging devices, such that along the circumference of the pile holder, the primary engaging devices alternate with the secondary engaging devices.

12. The pile holder according to claim 1, wherein each track structure supports at least one primary pile engaging device and at least one secondary pile engaging device.

13. The pile holder according to claim 1, wherein each track structure supports a primary pile engaging device or a secondary pile engaging device.

14. The pile holder according to claim 1, wherein the track structures form a first ring shaped track and a second ring shaped track, both the first track and the second extending along a full inner circumference of the pile holder.

15. The pile holder according to claim 1, wherein the pile holder with the first jaw and the second jaw in the closed position forms an annular structure and the track structures extend along the inner circumference of the annular structure.

16. The pile holder according to claim 1, wherein the one or more pile engaging elements comprise two or more pile guiding rollers supported in a carrier that is pivotably connected to a support end of a suspension arm to pivot about a carrier pivot axis, the suspension arm in turn being pivotable about a suspension arm pivot axis, wherein the two or more pile guiding rollers each have an axis of rotation, and are supported by the carrier such that their axis of rotation extend parallel to the carrier pivot axis, and wherein the carrier pivot axis extends parallel to the suspension arm pivot axis.

17. The pile holder according to claim 1, wherein the base structure, the first jaw and the second jaw each support at least one pile engaging device.

18. A pile holding system to be mounted on a deck of a vessel, the pile holding system being configured to support a pile in an upright position at a pile installation location next to the vessel, the pile holding system comprising:

the pile holder according to claim 1, and a pile holder support system to be mounted on the deck of the vessel, wherein the support system supports the pile holder at the base structure.

19. The pile holding system according to claim 18, wherein the pile holder support system is configured to move the pile holder in a first direction between an inboard position and an outboard position, wherein the first direction, when the pile holding system is mounted on the deck of the vessel, is substantially parallel to the deck of the vessel.

20. The pile holding system according to claim 19, wherein the pile holder, when in the outboard position, is located outside a contour of the vessel, for holding the pile in the upright position at the installation location, and wherein the pile holder, when in the inboard position with the first and second jaw in the open position, is located within the contour of the vessel.

* * * * *